US006885472B1

(12) United States Patent
Konno et al.

(10) Patent No.: US 6,885,472 B1
(45) Date of Patent: Apr. 26, 2005

(54) PRINTING SYSTEM, PRINTING APPARATUS, INFORMATION PROCESSING APPARATUS, CONTROL METHOD THEREFOR, AND COMPUTER-READABLE MEMORY

(75) Inventors: Yuji Konno, Kawasaki (JP); Miyuki Fujita, Tokyo (JP); Tetsuhiro Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 886 days.

(21) Appl. No.: 09/640,584

(22) Filed: Aug. 18, 2000

(30) Foreign Application Priority Data

Aug. 24, 1999 (JP) ............................................. 11-237528

(51) Int. Cl.⁷ .......................... G06F 12/00; G06F 13/00; G06F 15/00
(52) U.S. Cl. .......................... 358/1.15; 358/1.16; 347/5; 347/9; 347/14; 347/19; 235/375
(58) Field of Search ..................... 347/9, 19; 358/1.15, 358/1.16, 400; 235/375

(56) References Cited

U.S. PATENT DOCUMENTS

| | | | | |
|---|---|---|---|---|
| 4,313,124 A | | 1/1982 | Hara ...................... 346/140 R |
| 4,345,262 A | | 8/1982 | Shirato et al. .......... 346/140 R |
| 4,459,600 A | | 7/1984 | Sato et al. .............. 346/140 R |
| 4,463,359 A | | 7/1984 | Ayata et al. ................. 346/1.1 |
| 4,558,333 A | | 12/1985 | Sugitani et al. ......... 346/107 R |
| 4,723,129 A | | 2/1988 | Endo et al. .................. 346/1.1 |
| 4,740,796 A | | 4/1988 | Endo et al. .................. 346/1.1 |
| 5,049,898 A | * | 9/1991 | Arthur et al. ................. 347/19 |
| 5,218,376 A | | 6/1993 | Asai ............................ 346/1.1 |
| 5,621,539 A | * | 4/1997 | Brown et al. ................ 358/400 |
| 5,699,091 A | * | 12/1997 | Bullock et al. ............... 347/19 |
| 6,039,430 A | * | 3/2000 | Helterline et al. ............ 347/19 |
| 6,062,669 A | * | 5/2000 | Lee .............................. 347/19 |
| 6,158,850 A | * | 12/2000 | Cook ........................... 347/85 |
| 6,644,544 B1 | * | 11/2003 | Sanger et al. ............... 235/375 |

FOREIGN PATENT DOCUMENTS

| | | |
|---|---|---|
| EP | 0 764 535 A1 | 3/1997 |
| EP | 0 916 495 A2 | 5/1999 |
| EP | 0 925 920 A1 | 6/1999 |
| JP | 54-56847 | 5/1979 |
| JP | 54-161935 | 12/1979 |
| JP | 59-123670 | 7/1984 |
| JP | 59-138461 | 8/1984 |
| JP | 60-71260 | 4/1985 |
| JP | 61-185455 | 8/1986 |
| JP | 61-249768 | 11/1986 |
| JP | 1-095057 | 4/1989 |
| JP | 4-10941 | 1/1992 |
| JP | 6-166184 | 6/1994 |
| JP | 6-320732 | 11/1994 |
| JP | 10-003368 A | 1/1998 |
| JP | 11-105322 | 4/1999 |

* cited by examiner

*Primary Examiner*—Edward Coles
*Assistant Examiner*—Alan Rahimi
(74) *Attorney, Agent, or Firm*—Fitzpatrick, Cella, Harper & Scinto

(57) ABSTRACT

A printer stores head information about a printhead in an EEPROM, and outputs the head information from an I/F. A host computer receives the head information, and sets the processing parameters of an image processor for printing data to be output to the printer on the basis of the input head information.

11 Claims, 24 Drawing Sheets

FIG. 23

HEAD ID

FFFFFFFF

| | |
|---|---|
| Y | -2 |
| M | -1 |
| C | 0 |
| K | 0 |
| LC | +1 |
| LM | +2 |

FIG. 24

PRINTER DRIVER USER INTERFACE

HEAD ID

HEAD DISCHARGE AMOUNT
Y    M    C    K    LC    LM

PRINTING SYSTEM, PRINTING APPARATUS, INFORMATION PROCESSING APPARATUS, CONTROL METHOD THEREFOR, AND COMPUTER-READABLE MEMORY

FIELD OF THE INVENTION

The present invention relates to a printing system having an external apparatus for generating printing data and a printing apparatus for printing the printing data using a printhead, a printing apparatus, an information processing apparatus, a control method therefor, and a computer-readable memory.

Note that the present invention is applicable not only to a general printing apparatus but also to a copying machine, a facsimile apparatus having a communication system, a word processor having a printing unit, and an industrial printing apparatus combined with various processors.

BACKGROUND OF THE INVENTION

An inkjet printing apparatus capable of a color output generally comprises a plurality of printheads for discharging inks of four, yellow, cyan, magenta, and black colors (to be referred to as Y, M, C, and K hereinafter). Recently, to suppress dot graininess at highlights, many inkjet printing apparatuses adopt an arrangement of forming a color image using inks of six or more colors including light inks prepared by decreasing the densities of respective colors (e.g., light cyan and magenta inks prepared by decreasing the densities of cyan and magenta inks: to be referred to as LC and LM hereinafter), and inks having high concentrations that are usually used.

In general, four, Y, M, C, and K color inks or six, Y, M, C, K, LC, and LM color inks print data with their dedicated printheads. The discharge amount of each printhead varies owing to variations in structure during the printhead manufacturing process. For example, each discharge amount vary about ±10% with respect to a standard discharge amount. The variations in the discharge amount of each printhead result in different discharge amounts of the respective colors. As a result, the image density and tint vary.

The color tone of an output image is determined in accordance with the standard discharge amount of the printhead in terms of the printer design. An image printed by a printer using a printhead whose discharge amount is deviated from the standard one exhibits different color tone. As the image quality of recent inkjet printers increases, images almost equivalent to silver halide photographic images can be obtained. For the photographic image, the color tone is an important factor for determining the image quality. A color tone different from the designed value causes (1) low reproducibility
(2) omission of tone levels (in particular, low tone level reproducibility owing to unbalanced dark and light inks of the same color, failure to obtain linear tonability, and the like)
(3) generation of a pseudo outline This greatly degrades the image quality.

To solve this problem, there is a conventional method of printing a test pattern for determining variations in discharge amount, scanning the printed test pattern with a scanner to determine the discharge amount, and changing the processing parameters of image processing. This method can avoid degradation in image quality. However, the user must output a test pattern, a reading device such as a scanner is required, and the system becomes complicated and expensive.

There is another method of outputting a test pattern for determining the discharge amount, visually checking the test pattern by the user, and inputting the result by the user via the user interface of a host computer to correct the color tone. However, this method depends on a visual check by the user, so erroneous determination or an input error may occur. This may further degrade an image.

Japanese Patent Laid-Open No. 6-320732 discloses a technique of storing information about a printhead in an EEPROM attached to the printhead, and performing optimal head driving control based on the contents to increase the image quality. This method can stabilize a discharge state, but may fail to correct variations in discharge amount. Inkjet printheads disclosed in Japanese Patent Laid-Open Nos. 54-161935, 61-185455, 61-249768, and 4-10941 are characterized by a stable discharge amount regardless of head driving conditions and the like. However, correction under head driving control cannot increase the image quality.

SUMMARY OF THE INVENTION

The present invention has been made to overcome the above problems, and has as its object to provide a printing system, printing apparatus, and information processing apparatus capable of increasing the image quality, a control method therefor, and a computer-readable memory.

A printing system according to the present invention for achieving the above object has the following arrangement.

A printing system having an external apparatus for generating printing data corresponding to an image to be printed, and a printing apparatus for performing printing with a printhead on the basis of the printing data to be output from the external apparatus is characterized in that the printing apparatus comprises:
storage means for storing head information about the printhead; and
output means for outputting the head information, and
the external apparatus comprises:
image processing means for processing the printing data;
input means for inputting the head information; and
setting means for setting a processing parameter for processing by the image processing means on the basis of the head information input by the input means.

The head information preferably contains discharge amount information for each of a plurality of heads of the printhead and identification information unique to the printhead.

Preferably, the setting means comprises management means for managing the discharge amount information and the identification information for the printhead in correspondence with each other, and
when identification information corresponding to the identification information contained in the head information input by the input means is not managed by the management means, the setting means sets a processing parameter of image processing for the printing data to be output to the printing apparatus.

Preferably, the output means outputs the head information at the same timing as input of a printing start instruction from the external apparatus.

Preferably, the output means outputs the head information at the same timing as exchange of the printhead.

Preferably, the external apparatus and the printing apparatus are connected via a communication line, and
the output means transmits the head information to the external apparatus via the communication line.

Preferably, the external apparatus and the printing apparatus are connected via a communication line, and the input means receives the head information from the printing apparatus via the communication line.

Preferably, the output means outputs the head information to a printing medium.

Preferably, the input means includes a user interface displayed on a monitor.

Preferably, the printhead includes an ink-jet printhead for discharging ink to perform printing.

Preferably, the printhead includes a printhead for discharging ink using thermal energy, and comprises a thermal energy transducer for generating thermal energy to be applied to the ink.

A printing apparatus according to the present invention for achieving the above object has the following arrangement.

A printing apparatus for performing printing with a printhead on the basis of printing data input from an external apparatus comprises:

storage means for storing head information about the printhead;

output means for outputting the head information; and input means for inputting printing data having undergone image processing using a processing parameter based on the head information set by the external apparatus.

An image information apparatus according to the present invention for achieving the above object has the following arrangement.

An information processing apparatus for inputting printing data to a printing apparatus for performing printing with a printhead comprises:

input means for inputting head information about the printhead that is stored in the printing apparatus and output from the printing apparatus; and setting means for setting a processing parameter of image processing for the printing data to be output to the printing apparatus on the basis of the head information input by the input means.

A control method for a printing system according to the present invention for achieving the above object has the following steps.

A control method for a printing system having an external apparatus for generating printing data and a printing apparatus for performing printing with a printhead on the basis of the printing data comprises;

the storage step of storing head information about the printhead in an internal memory of the printing apparatus;

the output step of outputting the head information from the printing apparatus;

the input step of inputting the head information to the external apparatus; and the setting step of setting a processing parameter of image processing for the printing data to be output to the printing apparatus on the basis of the head information input in the input step.

A control method for a printing apparatus according to the present invention for achieving the above object has the following steps.

A control method for a printing apparatus for performing printing with a printhead on the basis of printing data input from an external apparatus comprises:

the storage step of storing head information about the printhead in a memory;

the output step of outputting the head information; and the input step of inputting printing data having undergone image processing using a processing parameter based on the head information set by the external apparatus.

A control method for an information processing apparatus according to the present invention for achieving the above object has the following steps.

A control method for an information processing apparatus for inputting printing data to a printing apparatus for performing printing with a printhead comprises:

the input step of inputting head information about the printhead that is stored in the printing apparatus and output from the printing apparatus; and the setting step of setting a processing parameter of image processing for the printing data to be output to the printing apparatus on the basis of the head information input in the input step.

A computer-readable memory according to the present invention for achieving the above object has the following program codes.

A computer-readable memory storing program codes of control of a printing system having an external apparatus for generating printing data and a printing apparatus for performing printing with a printhead on the basis of the printing data comprises:

a program code of the storage step of storing head information about the printhead in an internal memory of the printing apparatus;

a program code of the output step of outputting the head information from the printing apparatus;

a program code of the input step of inputting the head information to the external apparatus; and a program code of the setting step of setting a processing parameter of image processing for the printing data to be output to the printing apparatus on the basis of the head information input in the input step.

A computer-readable memory according to the present invention for achieving the above object has the following program codes.

A computer-readable memory storing program codes of control of a printing apparatus for performing printing with a printhead on the basis of printing data input from an external apparatus comprises:

a program code of the storage step of storing head information about the printhead in a memory;

a program code of the output step of outputting the head information; and a program code of the input step of inputting printing data having undergone image processing using a processing parameter based on the head information set by the external apparatus.

A computer-readable memory according to the present invention for achieving the above object has the following program codes.

A computer-readable memory storing program codes of control of an information processing apparatus for inputting printing data to a printing apparatus for performing printing with a printhead comprises:

a program code of the input step of inputting head information about the printhead that is stored in the printing apparatus and output from the printing apparatus; and a program code of the setting step of setting a processing parameter of image processing for the printing data to be output to the printing apparatus on the basis of the head information input in the input step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 23 is a view showing a printing example of head information printed by a printer in the third embodiment; and FIG. 24 is a view showing a user interface for inputting head information in the third embodiment.

DETAILED DESCRIPTION OF THE PREFERRED EMBODIMENTS

Embodiments according to a printing apparatus of the present invention will be described below with reference to the accompanying drawings.

In the embodiments to be explained below, a printing apparatus using an inkjet printing system will be described by taking a printer as an example.

In this specification, "print" is not only to form significant information such as characters and graphics but also to form, e.g., images, figures, and patterns on printing media in a broad sense, regardless of whether the information formed is significant or insignificant or whether the information formed is visualized so that a human can visually perceive it, or to process printing media.

"Printing media" are any media capable of receiving ink, such as cloth, plastic films, metal plates, glass, ceramics, wood, and leather, as well as paper sheets used in common printing apparatuses.

Furthermore, "ink" (to be also referred to as a "liquid" hereinafter) should be broadly interpreted like the definition of "print" described above. That is, ink is a liquid which is applied onto a printing medium and thereby can be used to form images, figures, and patterns, to process the printing medium, or to process ink (e.g., to solidify or insolubilize a colorant in ink applied to a printing medium).

[Apparatus Main Body]

Figure 1:
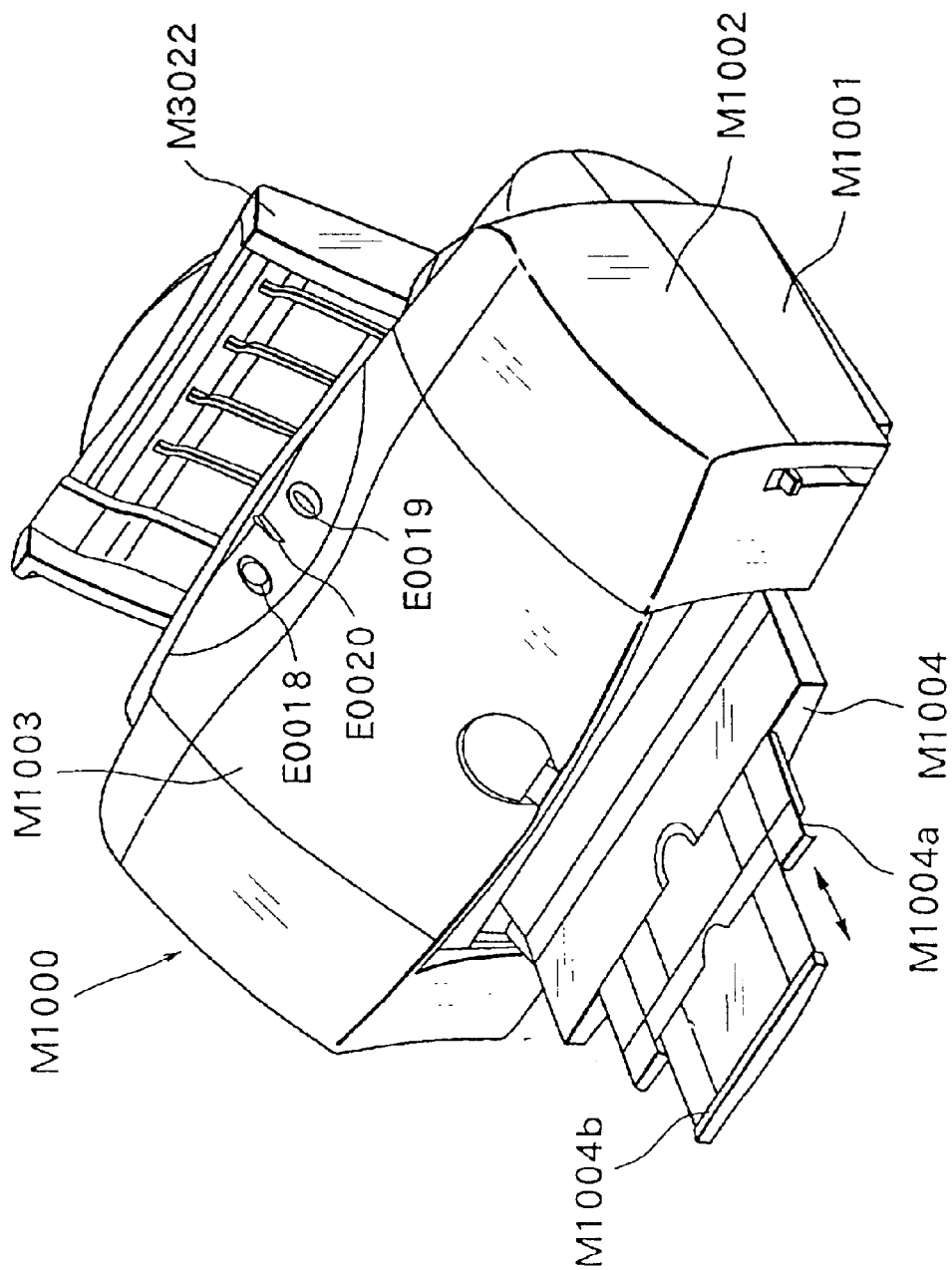
FIG. 1 is a perspective view showing the external appearance of an inkjet printer according to an embodiment of the present invention.
Figure 2:
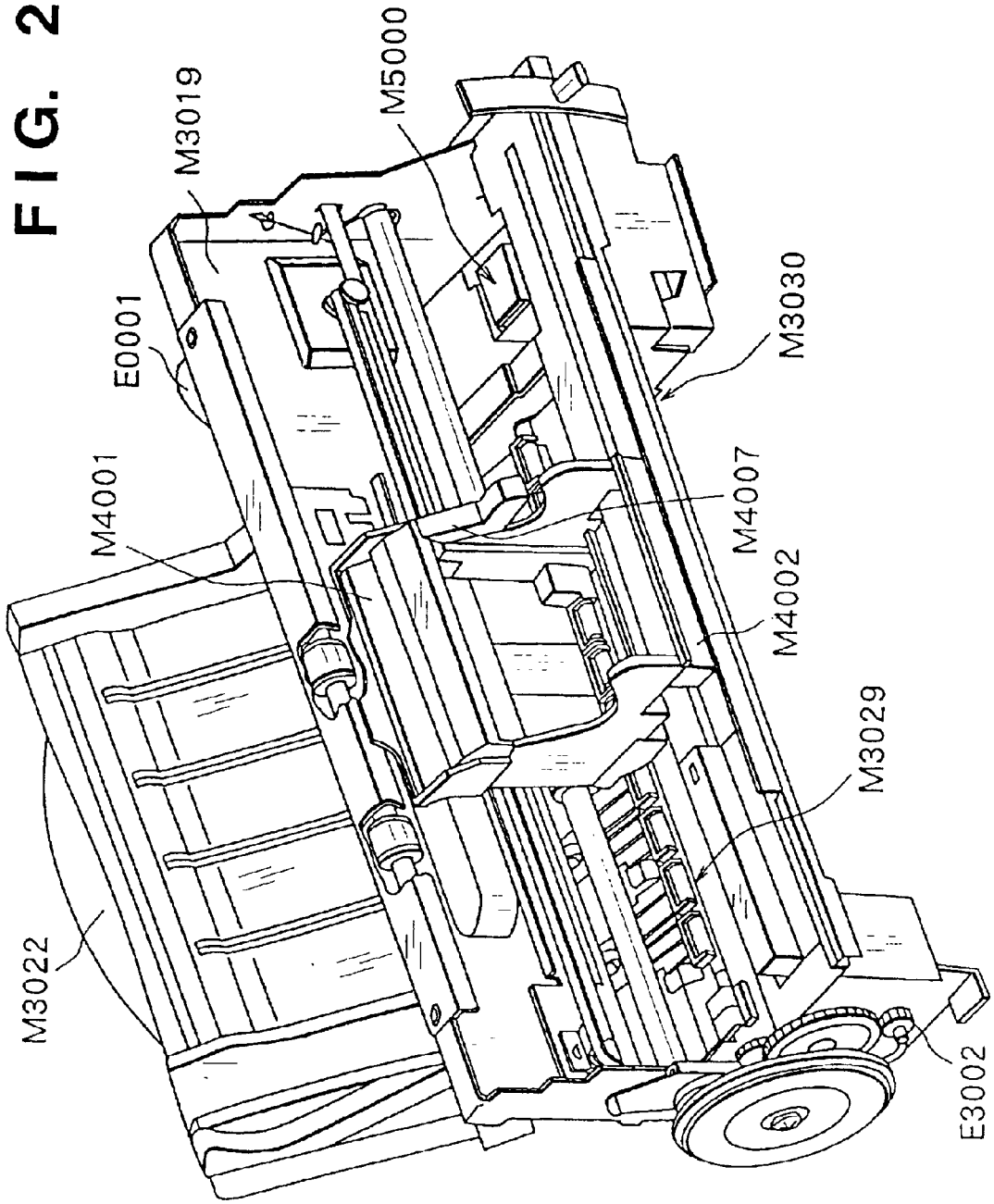
FIG. 2 is a perspective view showing the state in which external parts of the printer shown in FIG. 1 are removed.

FIGS. 1 and 2 show an outline of the arrangement of a printer using an inkjet printing system. Referring to FIG. 1, an apparatus main body M1000 as a shell of the printer according to this embodiment is composed of external members, i.e., a lower case M1001, upper case M1002, access cover M1003, and delivery tray M1004, and a chassis M3019 (FIG. 2) accommodated in these external members.

The chassis M3019 is made of a plurality of plate-like metal members having predetermined stiffness, forms a framework of the printing apparatus, and holds various printing mechanisms to be described later.

The lower case M1001 forms a substantially lower half of the apparatus main body M1000, and the upper case M1002 forms a substantially upper half of the apparatus main body M1000. The combination of these two cases forms a hollow structure having a housing space for housing diverse mechanisms to be described later. Openings are formed in the top surface and the front surface of this hollow structure.

One end portion of the delivery tray M1004 is rotatably held by the lower case M1001. By rotating this delivery tray M1004, the opening formed in the front surface of the lower case M1001 can be opened and closed. When printing is to be executed, therefore, the delivery tray M1004 is rotated forward to open the opening to allow printing sheets to be delivered from this opening, and delivered printing sheets P can be stacked in order. Also, the delivery tray M1004 accommodates two auxiliary trays M1004a and M1004b. By pulling each tray forward as needed, the sheet support area can be increased and reduced in three steps.

One end portion of the access cover M1003 is rotatably held by the upper case M1002. This allows this access cover M1003 to open and close the opening formed in the top surface of the upper case M1002. By opening this access cover M1003, a printhead cartridge H1000 or an ink tank H1900 housed inside the main body can be replaced. Although not shown, when the access cover M1003 is opened or closed, a projection formed on the rear surface of this access cover M1003 rotates a cover opening/closing lever. A microswitch or the like detects the rotated position of this lever. In this way, the open/closed state of the access cover can be detected.

Figure 7:
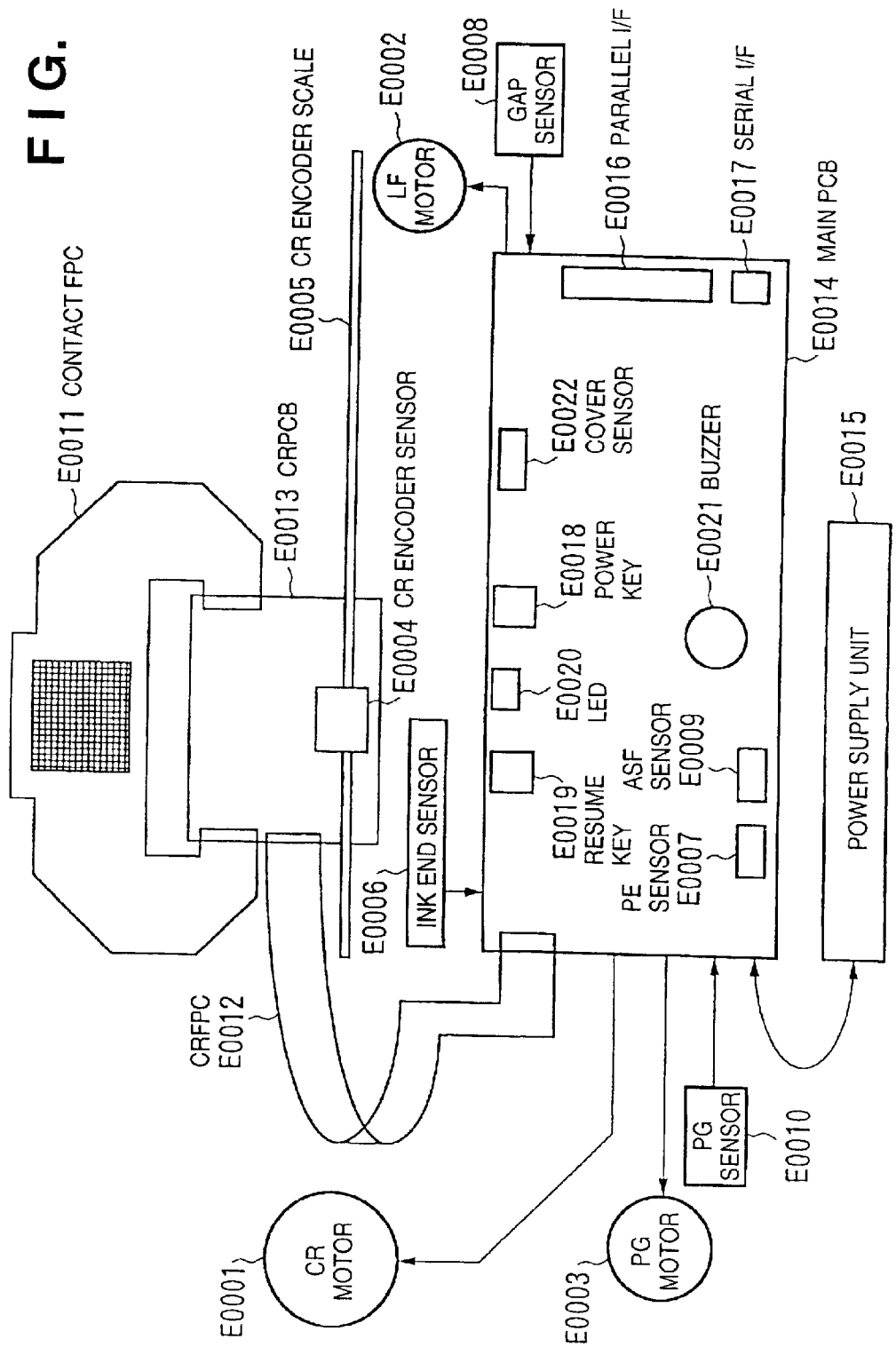
FIG. 7 is a block diagram schematically showing the overall arrangement of an electronic circuit in the embodiment of the present invention.

On the top surface in the rear portion of the upper case M1002, a power key E0018 and a resume key E0019 are arranged to be able to be pressed, and an LED E0020 is also arranged. When the power key E0018 is pressed, the LED E0020 is turned on to inform the operator that printing is possible. This LED E0020 has various display functions, e.g., informs the operator of a trouble of the printer by changing the way the LED E0020 turns on and off, changing the color of light, or sounding a buzzer E0021 (FIG. 7). When the trouble is solved, printing is restarted by pressing the resume key E0019.

[Printing Mechanisms]

Printing mechanisms of this embodiment housed in and held by the apparatus main body M1000 of the above printer will be described below.

The printing mechanisms according to this embodiment are: an automatic feeder M3022 for automatically feeding the printing sheets P into the apparatus main body; a conveyor unit M3029 for guiding the printing sheets P fed one by one from the automatic feeder to a desired printing position and guiding these recording sheets P from the printing position to a delivery unit M3030; a printing unit for performing desired printing on each printing sheet P conveyed by the conveyor unit M3029; and a recovery unit (M5000) for recovering, e.g., the printing unit.

(Printing Unit)

The printing unit will be described below.

This printing unit includes a carriage M4001 movably supported by a carriage shaft M4021, and the printhead cartridge H1000 detachably mounted on this carriage M4001.

Printhead Cartridge

First, the printhead cartridge will be described with reference to FIGS. 3 to 5.

Figure 3:
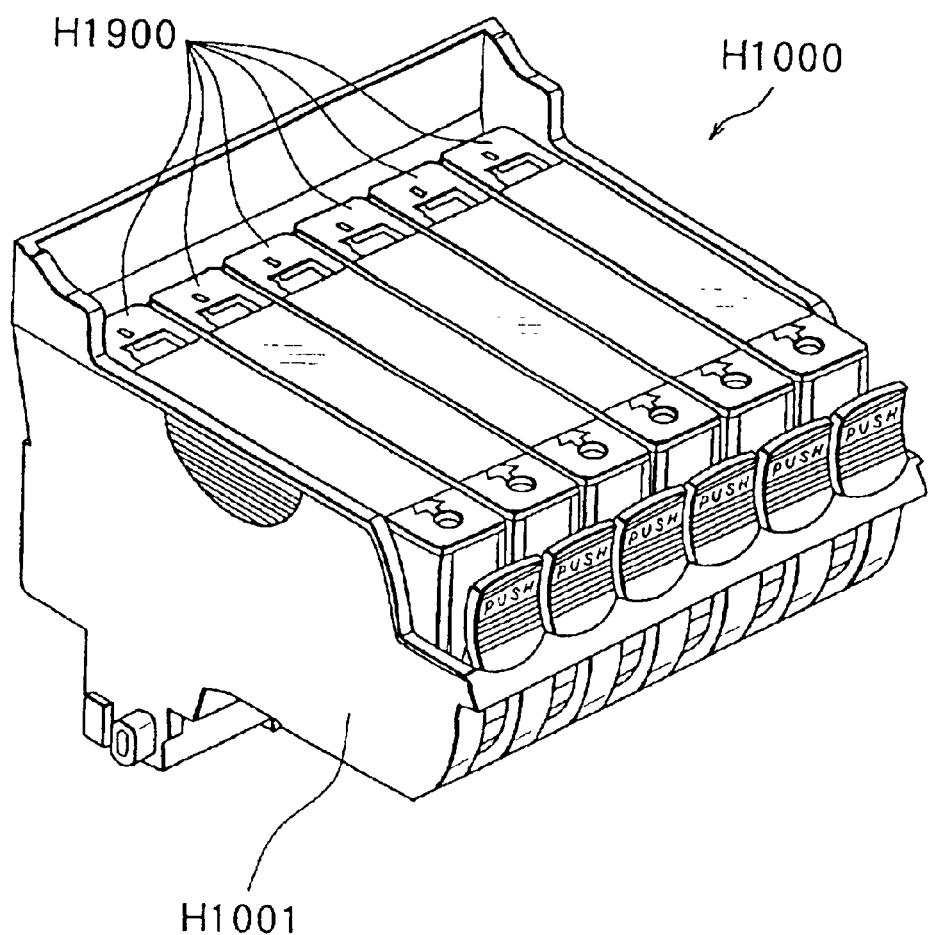
FIG. 3 is an exploded perspective view showing a printhead cartridge used in the embodiment of the present invention.
Figure 4:
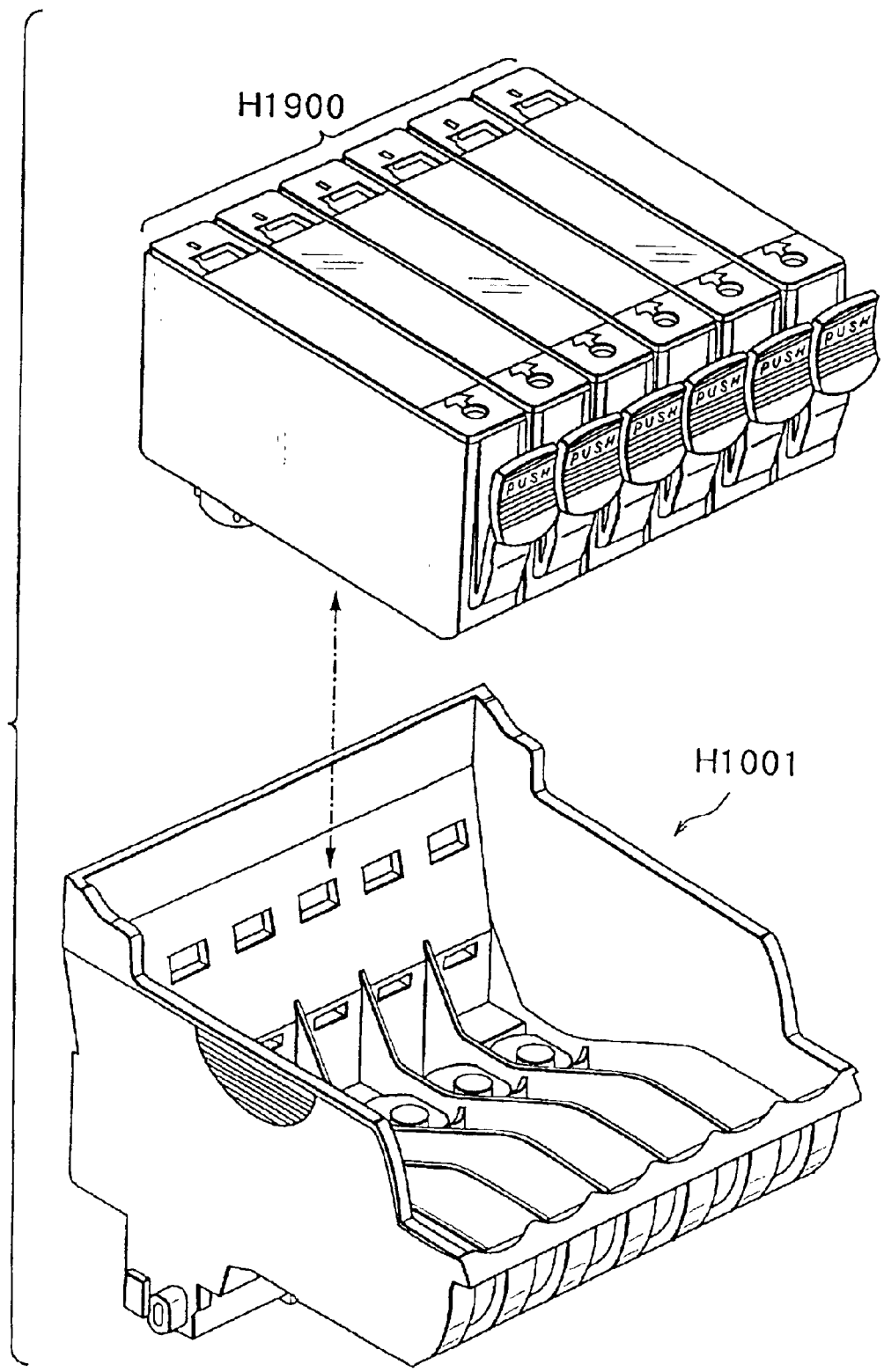
FIG. 4 is a side view showing the state in which the printhead cartridge shown in FIG. 3 is assembled.

As shown in FIG. 3, the printhead cartridge H1000 of this embodiment has the ink tank H1900 containing ink and a printhead H1001 for discharging the ink supplied from this ink tank H1900 from nozzles in accordance with printing information. This printhead H1001 is of a so-called cartridge type detachably mounted on the carriage M4001 (to be described later).

To make photographic high-quality color printing feasible, the printhead cartridge H1000 of this embodiment includes independent color ink tanks, e.g., black, light cyan, light magenta, cyan, magenta, and yellow ink tanks. As shown in FIG. 4, these ink tanks can be independently attached to and detached from the printhead H1001.

Figure 5:
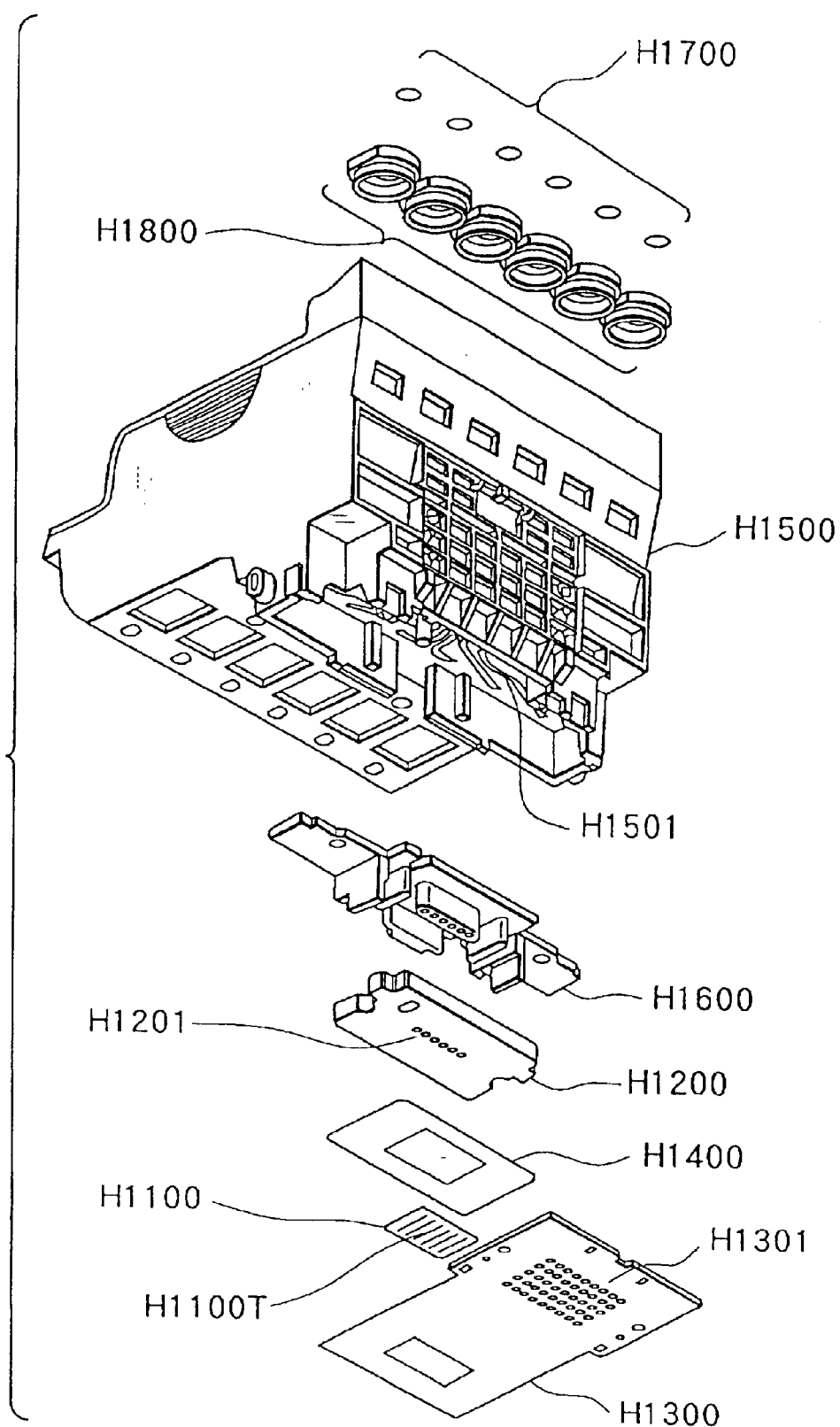
FIG. 5 is a perspective view showing the printhead of FIG. 4 when obliquely viewed from below.

As shown in an exploded perspective view of FIG. 5, the printhead H1001 comprises a printing element board H1100, first plate H1200, electrical printed circuit board H1300, second plate H1400, tank holder H1500, channel forming member H1600, filters H1700, and sealing rubber members H1800.

On the printing element board H1100, a plurality of printing elements for discharging ink and electric lines made of, e.g., Al for supplying electric power to these printing elements are formed on one surface of an Si substrate by film formation technologies. A plurality of ink channels and a plurality of discharge orifices H1100T corresponding to the printing elements are formed by photolithography. Also, ink supply ports for supplying ink to these ink channels are formed in the rear surface. This printing element board H1100 is fixed to the first plate H1200 by adhesion. Ink supply ports H1201 for supplying ink to the printing element board H1100 are formed in this first plate H1200.

Furthermore, the second plate H1400 having an opening is fixed to the first plate H1200 by adhesion. This second plate H1400 holds the electric printed circuit board 1300 such that the electric printed circuit board H1300 and the printing element board H1100 are electrically connected.

This electric printed circuit board H1300 applies an electrical signal for discharging ink to the printing element board H1100. The electric printed circuit board H1300 has electric lines corresponding to the printing element board H1100, and external signal input terminals H1301 formed in end portions of these electric lines to receive electrical signals from the main body. The external signal input terminals H1301 are positioned and fixed at the back of the tank holder H1500.

The channel forming member H1600 is ultrasonically welded to the tank holder H1500 for detachably holding the ink tanks H1900, thereby forming ink channels H1501 from the ink tanks H1900 to the first plate H1200. Also, the filters H1700 are formed at those end portions of the ink channels H1501, which engage with the ink tanks H1900, to prevent invasion of dust from the outside. The sealing rubber members H1800 are attached to the portions engaging with the ink tanks H1900 to prevent evaporation of ink from these engaging portions.

Furthermore, the printhead H1001 is constructed by bonding, by an adhesive or the like, a tank holder unit composed of the tank holder H1500, channel forming member H1600, filters H1700, and sealing rubber members H1800 to a printing element unit composed of the printing element board H1100, first plate H1200, electric printed circuit board H1300, and second plate H1400.

(Carriage)

The carriage M4001 will be described below with reference to FIG. 2.

As shown in FIG. 2, this carriage M4001 includes a carriage cover M4002 and head set lever M4007. The carriage cover M4002 engages with the carriage M4001 and guides the printhead H1001 to the mount position of the carriage M4001. The head set lever M4007 engages with the tank holder H1500 of the printhead H1001 and pushes the printhead H1000 such that the printhead H1000 is set in a predetermined mount position.

That is, the head set lever M4007 is set in the upper portion of the carriage M4001 so as to be pivotal about a head set level shaft. Also, a head set plate (not shown) is set via a spring in a portion which engages with the printhead H1001. By the force of this spring, the printhead H1001 is pushed and mounted on the carriage M4001.

A contact flexible print cable (to be referred to as a contact FPC hereinafter) E0011 is set in another engaging portion of the carriage M4001 with respect to the printhead H1001. Contact portions E0011a on this contact FPC E0011 and the contact portions (external signal input terminals) H1301 formed on the printhead H1001 electrically contact each other to exchange various pieces of information for printing or supply electric power to the printhead H1001.

An elastic member (not shown) made of, e.g., rubber is formed between the contact portions E0011a of the contact FPC E0011 and the carriage M4001. The elastic force of this elastic member and the biasing force of the head set lever spring make reliable contact between the contact portions E0011a and the carriage M4001 possible. Furthermore, the contact FPC E0011 is connected to a carriage printed circuit board E0013 mounted on the back surface of the carriage M4001 (FIG. 7).

[Scanner]

The printer of this embodiment is also usable as a reading apparatus by replacing the printhead with a scanner.

This scanner moves together with the carriage of the printer and reads an original image supplied instead of a printing medium in a sub-scan direction. Information of one original image is read by alternately performing the read operation and the original feed operation.

Figure 6B:
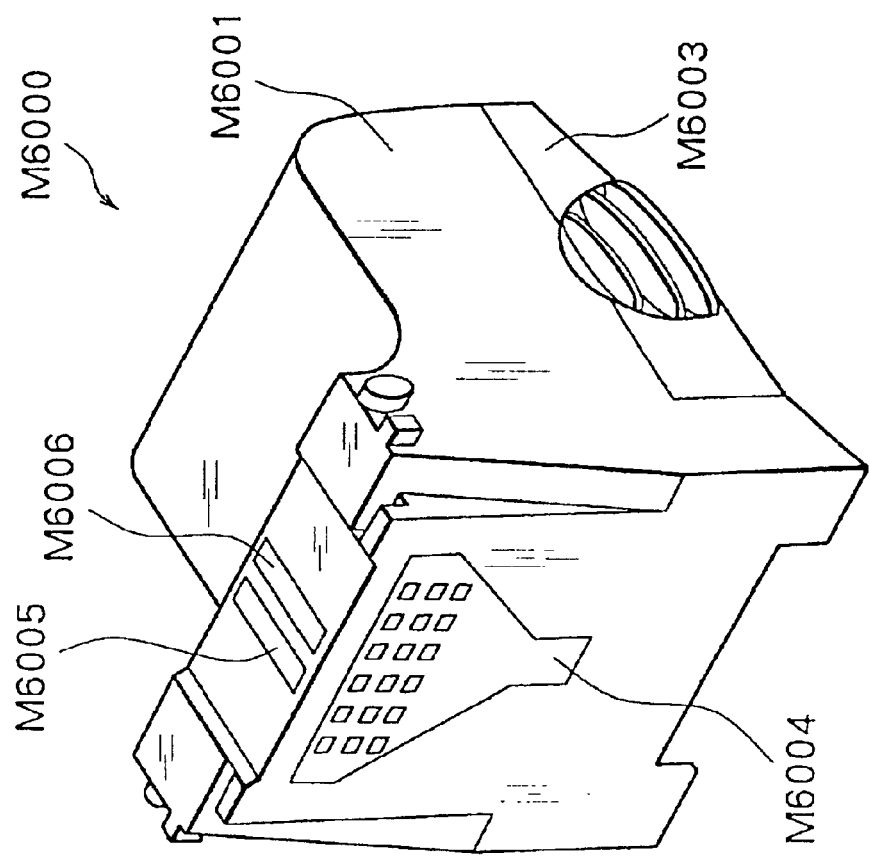
FIGS. 6A and 6B are perspective views showing a scanner cartridge in the embodiment of the present invention.
Figure 6A:
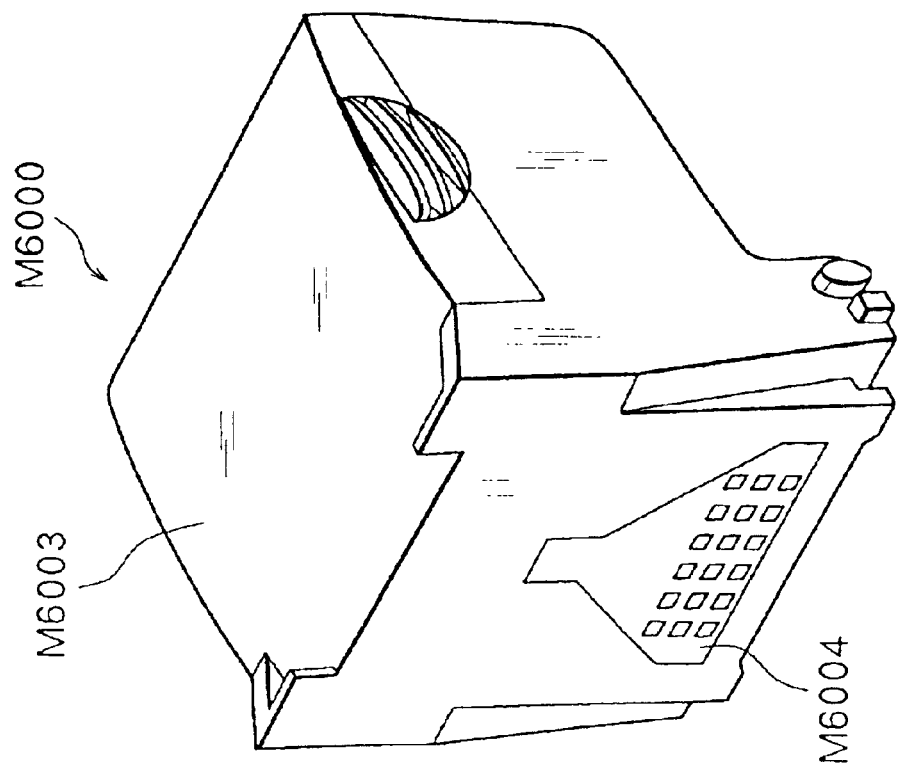

FIGS. 6A and 6B are views showing an outline of the arrangement of this scanner M6000.

As shown in FIGS. 6A and 6B, a scanner holder M6001 has a box-like shape and contains optical systems and processing circuits necessary for reading. A scanner read lens M6006 is placed in a portion which faces the surface of an original when this scanner M6000 is mounted on the carriage M4001. This scanner read lens M6006 reads an original image. A scanner illuminating lens M6005 contains a light source (not shown), and light emitted by this light source irradiates an original.

A scanner cover M6003 fixed to the bottom portion of the scanner holder M6001 so fits as to shield the interior of the scanner holder M6001 from light. Louver-like handles formed on the side surfaces of this scanner cover M6003 facilitate attachment to and detachment from the carriage M4001. The external shape of the scanner holder M6001 is substantially the same as the printhead cartridge H1000. So, the scanner holder M6001 can be attached to and detached from the carriage M4001 by operations similar to the printhead cartridge H1000.

Also, the scanner holder M6001 accommodates a board having the processing circuits described above and a scanner contact PCB M6004 connected to this board and exposed to the outside. When the scanner M6000 is mounted on the carriage M4001, this scanner contact PCB M6004 comes in contact with the contact FPC E0011 of the carriage M4001, thereby electrically connecting the board to the control system of the main body via the carriage M4001.

An electric circuit configuration in this embodiment of the present invention will be described next.

FIG. 7 is a view schematically showing the overall arrangement of an electric circuit in this embodiment.

The electric circuit of this embodiment primarily comprises the carriage printed circuit board (CRPCB) E0013, a main PCB (Printed Circuit Board) E0014, and a power supply unit E0015.

The power supply unit is connected to the main PCB E0014 to supply various driving power.

The carriage printed circuit board E0013 is a printed circuit board unit mounted on the carriage M4001 (FIG. 2) and functions as an interface for exchanging signals with the printhead through the contact FPC E0011. Also, on the basis of a pulse signal output from an encoder sensor E0004 in accordance with the movement of the carriage M4001, the carriage printed circuit board E0013 detects changes in the positional relationship between an encoder scale E0005 and the encoder sensor E0004 and outputs a signal to the main PCB E0014 through a flexible flat cable (CRFFC) E0012.

The main PCB is a printed circuit board unit for controlling driving of individual parts of the ink-jet printing apparatus of this embodiment. This main PCB has, on the board, I/O ports for, e.g., a paper end sensor (PE sensor) E0007, an ASF sensor E0009, a cover sensor E0022, a parallel interface (parallel I/F) E0016, a serial interface (serial I/F) E0017, the resume key E0019, the LED E0020, the power key E0018, and the buzzer E0021. The main PCB is also connected to a CR motor E0001, an LF motor E0002, and a PG motor E0003 to control driving of these motors. Additionally, the main PCB has interfaces connecting to an ink end sensor E0006, a GAP sensor E0008, a PG sensor E0010, a CRFFC E0012, and the power supply unit E0015.

Figure 8:
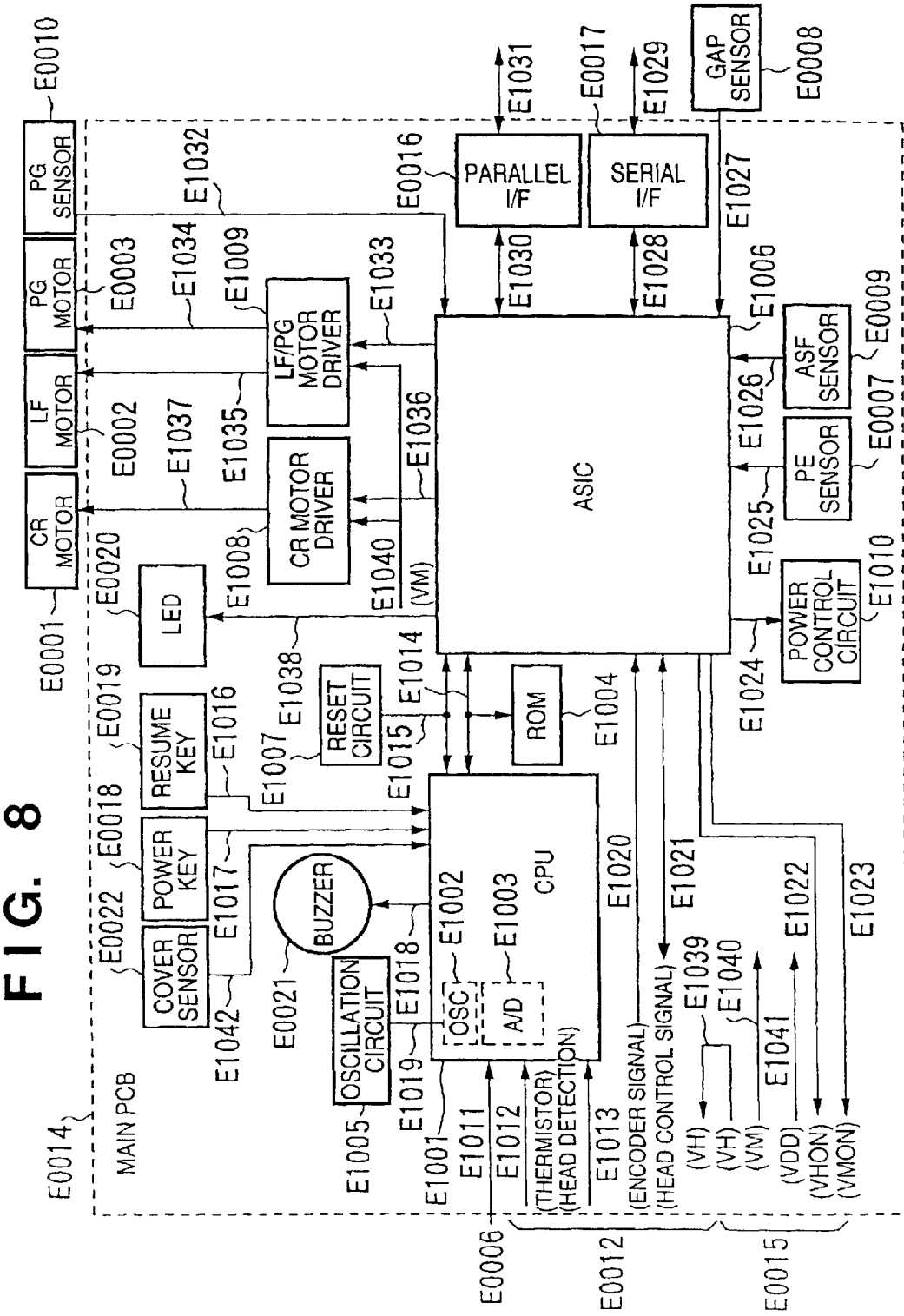
FIG. 8 is a block diagram showing the internal arrangement of a main PCB shown in FIG. 7.

FIG. 8 is a block diagram showing the internal arrangement of the main PCB.

Referring to FIG. 8, a CPU E1001 internally has an oscillator OSC E1002 and is connected to an oscillation circuit E1005 to generate a system clock by an output signal E1019 from the oscillation circuit E1005. Also, the CPU E1001 is connected to a ROM E1004 and an ASIC (Application Specific Integrated Circuit) E1006. In accordance with programs stored in the ROM E1004, the CPU E1001 controls the ASIC and senses the statuses of an input signal E1017 from the power key, an input signal E1016 from the resume key, a cover sensing signal E1042, and a head sensing signal (HSENS) E1013. Additionally, the CPU E1001 drives the buzzer E0021 by a buzzer signal (BUZ) E1018 and senses the statuses of an ink end sensing signal (INKS) E1011 and a thermistor temperature sensing signal (TH) E1012 connected to a built-in A/D converter E1003. Furthermore, the CPU E1001 controls driving of the inkjet printing apparatus by performing various logic operations and condition judgements.

The head sensing signal E1013 is a head mounting sensing signal which the printhead cartridge H1000 inputs via the flexible flat cable E0012, the carriage printed circuit board E0013, and the contact flexible print cable E0011. The ink end sensing signal is an output analog signal from the ink end sensor E0006. The thermistor temperature sensing signal E1012 is an analog signal from a thermistor (not shown) formed on the carriage printed circuit board E0013.

A CR motor driver E1008 is supplied with motor power (VM) E1040 as a driving source. In accordance with a CR motor control signal E1036 from the ASIC E1006, the CR motor driver E1008 generates a CR motor driving signal E1037 to drive the CR motor E0001. An LF/PG motor driver E1009 is also supplied with the motor power E1040 as a driving source. In accordance with a pulse motor control signal (PM control signal) E1033 from the ASIC E1006, the LF/PG motor driver E1009 generates an LF motor driving signal E1035 to drive the LF motor and also generates a PG motor driving signal E1034 to drive the PG motor.

A power control circuit E1010 controls power supply to each sensor having a light-emitting element, in accordance with a power control signal E1024 from the ASIC E1006. The parallel I/F E0016 transmits a parallel I/F signal E1030 from the ASIC E1006 to a parallel I/F cable E1031 connected to the outside, and transmits signals from this parallel I/F cable E1031 to the ASIC E1006. The serial IF E0017 transmits a serial I/F signal E1028 from the ASIC E1006 to a serial I/F cable E1029 connected to the outside, and transmits signals from this cable E1029 to the ASIC E1006.

The power supply unit E0015 supplies head power (VH) E1039, the motor power (VM) E1040, and logic power (VDD) E1041. A head power ON signal (VHON) E1022 and a motor power ON signal (VMOM) E1023 from the ASIC E1006 are input to the power supply unit E0015 to control ON/OFF of the head power E1039 and the motor power E1040, respectively. The logic power (VDD) E1041 supplied from the power supply unit E0015 is subjected to voltage transformation where necessary and supplied to individual units inside and outside the main PCB E0014.

The head power E1039 is smoothed on the main PCB E0014, supplied to the flexible flat cable E0011, and used to drive the printhead cartridge H1000.

A reset circuit E1007 detects a decrease in the logic power-supply voltage E1040 and supplies a reset signal (RESET) E1015 to the CPU E1001 and the ASIC E1006 to initialize them.

This ASIC E1006 is a one-chip semiconductor integrated circuit which is controlled by the CPU E1001 via a control bus E1014, outputs the CR motor control signal E1036, the PM control signal E1033, the power control signal E1024, the head power ON signal E1022, and the motor power ON signal E1023, and exchanges signals with the parallel I/F E10016 and the serial I/F E0017. Also, the ASIC E1006 senses the statuses of a PE sensing signal (PES) E1025 from the PE sensor E0007, an ASF sensing signal (ASFS) E1026 from the ASF sensor E0009, a GAP sensing signal (GAPS) E1027 from the GAP sensor E0008, and a PG sensing signal (PGS) E1032 from the PG sensor E0010, and transmits data indicating the statuses to the CPU E1001 through the control bus E1014. On the basis of the input data, the CPU E1001 controls driving of the LED driving signal E1038 to turn on and off the LED E0020.

Furthermore, the ASIC E1006 senses the status of an encoder signal (ENS) E1020 to generate a timing signal and interfaces with the printhead cartridge H1000 by a head control signal E1021, thereby controlling a printing operation. The encoder signal (ENC) E1020 is an output signal from the CR encoder sensor E0004, that is input through the flexible flat cable E0012. The head control signal E1021 is supplied to the printhead cartridge E1000 through the flexible flat cable E0012, the carriage printed circuit board E0013, and the contact FPC E0011.

Figure 9:
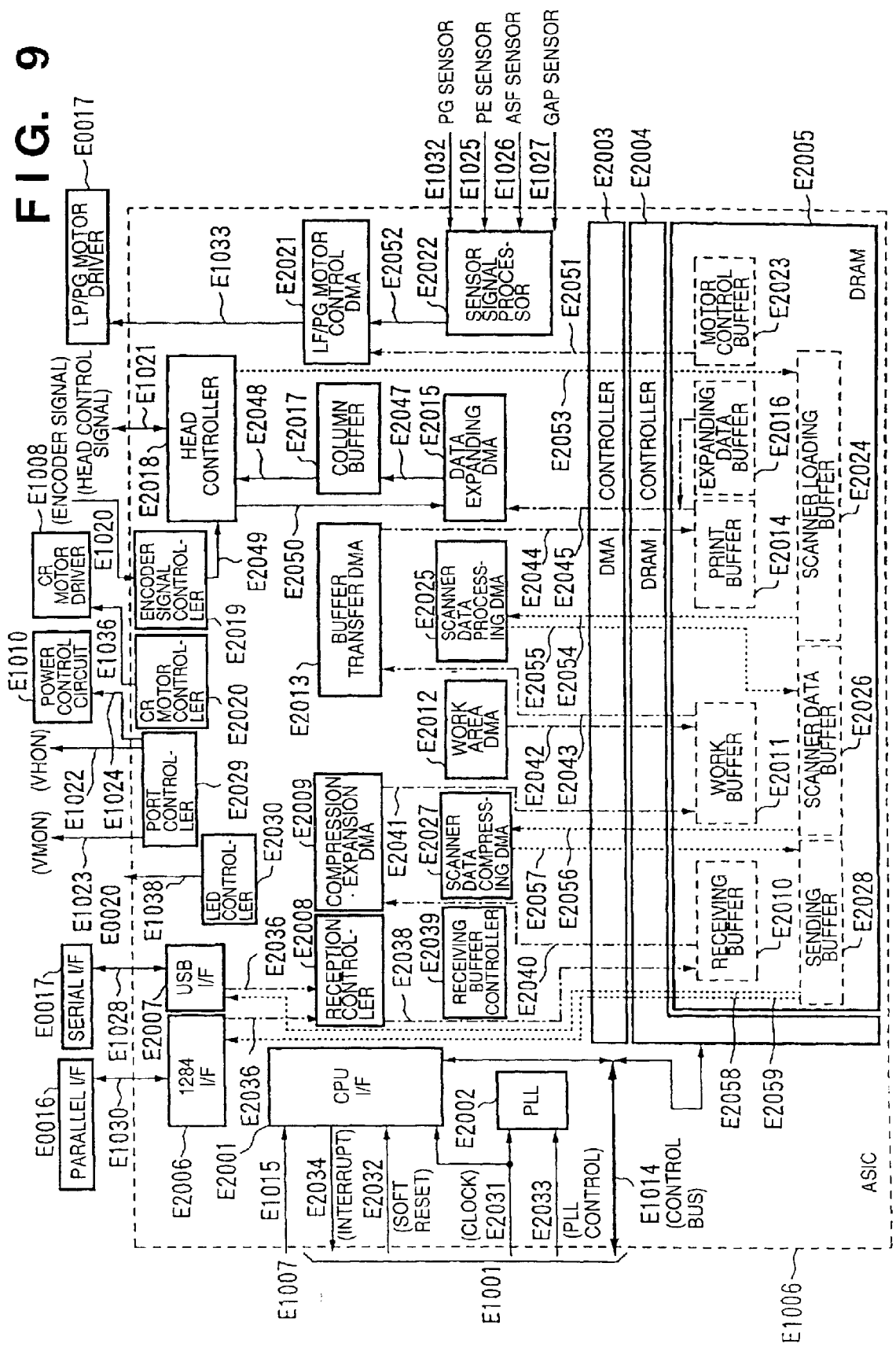
FIG. 9 is a block diagram showing the internal arrangement of an ASIC shown in FIG. 8.

FIG. 9 is a block diagram showing the internal arrangement of the ASIC E1006.

Referring to FIG. 9, only flows of data, such as printing data and motor control data, pertaining to control of the head and each mechanical part are shown in connections between individual blocks. Control signals and clocks concerning read and write of a built-in register in each block and control signals related to DMA control are omitted to avoid the complexity of description in the drawing.

As shown in FIG. 9, a PLL E2002 generates a clock (not shown) to be supplied to the most part of the ASIC E1006, in accordance with a clock signal (CLK) E2031 and PLL control signal (PLLON) E2033 output from the CPU E1001.

A CPU interface (CPU I/F) E2001 controls read and write to a register in each block (to be described below), supplies clocks to some blocks, and accepts an interrupt signal (none of these functions is shown), in accordance with the reset signal E1015, a soft reset signal (PDWN) E2032 and the clock signal (CLK) E2031 output from the CPU E1001, and a control signal from the control bus E1014. This CPU I/F E2001 outputs an interrupt signal (INT) E2034 to the CPU E1001 to inform the CPU E1001 of generating an interrupt in the ASIC E1006.

A DRAM E2005 has areas such as a receiving buffer E2010, work buffer E2011, print buffer E2014, and expanding data buffer E2016, as printing data buffers, and also has a motor control buffer E2023 for motor control. In addition to these printing data buffers, the DRAM E2005 has areas such as a scanner loading buffer E2024, scanner data buffer E2026, and sending buffer E2028, as buffers for use in a scanner operation mode.

This DRAM E2005 is also used as a work area necessary for the operation of the CPU E1001. That is, a DRAM controller E2004 switches between access from the CPU E1001 to the DRAM E2005 using the control bus and access from a DMA controller E2003 (to be described below) to the DRAM E2005, thereby performing read and write to the DRAM E2005.

The DMA controller E2003 accepts a request (not shown) from each block and outputs, to the RAM controller, an address signal and a control signal (neither is shown), or write data (E2038, E2041, E2044, E2053, E2055, or E2057) when a write operation is to be performed, thereby performing DRAM access. When a read operation is to be performed, the DMA controller E2003 transfers readout data (E2040, E2043, E2045, E2051, E2054, E2056, E2058, or E2059) from the DRAM controller E2004 to the block which has requested.

A 1284 I/F E2006 interfaces by two-way communication with an external host apparatus (not shown) through the parallel I/F E0016 under the control of the CPU E1001 via the CPU I/F E2001. Also, when printing is to be performed, the 1284 I/F E2006 transfers received data (PIF received data E2036) from the parallel I/F E0016 to a reception controller E2008 by DMA processing. When scanner read is to be performed, the 1284 I/F E2006 transmits data (1284 transmission data (RDPIF) E2059) stored in the sending buffer E2028 in the DRAM E2005 to the parallel I/F by DMA processing.

A USB I/F E2007 interfaces by two-way communication with an external host apparatus (not shown) through the serial I/F E0017 under the control of the CPU E1001 via the CPU I/F E2001. Also, when printing is to be performed, the USB I/F E2007 transfers received data (USB received data E2037) from the serial I/F E0017 to the reception controller E2008 by DMA processing. When scanner read is to be performed, the USB I/F E2007 transmits data (USB transmission data (RDPIF) E2058) stored in the sending buffer E2028 in the DRAM E2005 to the serial I/F by DMA processing. The reception controller E2008 writes received data (WDIF) E2038 from a selected one of the 1284 I/F E2006 and the USB I/F E2007 into a receiving buffer write address managed by a receiving buffer controller E2039.

A compression expansion DMA E2009 reads out, under the control of the CPU E1001 via the CPU I/F E2001, received data (raster data) stored on the receiving buffer E2010 from a receiving buffer read address managed by the receiving buffer controller E2039, compresses or expands readout data (RDWK) E2040 in accordance with a designated mode, and writes the data as a printing code string (WDWK) E2041 in the work buffer area.

A printing buffer transfer DMA E2013 reads out, under the control of the CPU E1001 via the CPU I/F E2001, printing codes (RDWP) E2043 on the work buffer E2011, rearranges each printing code into an address on the print buffer E2014, which is suitable for the order of data transfer to the printhead cartridge H1000, and transfers the code (WDWP E2044). A work clear DMA E2012 repeatedly transfers and writes, under the control of the CPU E1001 via the CPU I/F E2001, designated work file data (WDWF) E2042 in a region on the work buffer to which the data is completely transferred by the printing buffer transfer DMA E2015.

A printing data expanding DMA E2015 reads out, under the control of the CPU E1001 via the CPU I/F E2001, the printing codes rearranged and written on the print buffer and expanding data written on the expanding data buffer E2016, by using a data expansion timing signal E2050 from a head controller E2018 as a trigger, thereby generating expanded printing data (WDHDG) E2045, and writes the generated data as column buffer write data (WDHDG) E2047 in a column buffer E2017. This column buffer E2017 is an SRAM for temporarily storing data (expanded printing data) to be transferred to the printhead cartridge H1000. The column buffer E2017 is shared and managed by the printing data expanding DMA and the head controller in accordance with a handshake signal (not shown) of these two blocks.

Under the control of the CPU E1001 via the CPU I/F E2001, this head controller E2018 interfaces with the printhead cartridge H1000 or the scanner via a head control signal. In addition, on the basis of a head driving timing signal E2049 from an encoder signal processor E2019, the head controller E2018 outputs a data expansion timing signal E2050 to the printing data expanding DMA.

When printing is to be performed, the head controller E2018 reads out expanded printing data (RDHD) E2048 from the column buffer in accordance with the head driving timing signal E2049. The head controller E2018 outputs the readout data to the printhead cartridge H1000 via the head control signal E1021.

In a scanner read mode, the head controller E2018 transfers loaded data (WDHD) E2053 input via the head control signal E1021 to the scanner loading buffer E2024 on the DRAM E2005 by DMA transfer. A scanner data processing DMA E2025 reads out, under the control of the CPU E1001 via the CPU I/F E2001, loading buffer readout data (RDAV) E2054 stored in the scanner loading buffer E2024 into a scanner data buffer E2026 on the DRAM E2005 and writes processed data (WDAV) E2055, subjected to processing such as averaging, into the scanner data buffer E2016 on the DRAM E2005.

A scanner data compressing DMA E2027 reads out processed data (RDYC) E2056 on the scanner data buffer E2026, compresses the data, and writes compressed data (WDYC) E2057 in the sending buffer E2028, under the control of the CPU E1001 via the CPU I/F E2001.

The encoder signal processor E2019 receives an encoder signal (ENC) and outputs the head driving timing signal E2049 in accordance with a mode determined by the control of the CPU E1001. In addition, the encoder signal processor E2019 stores information concerning the position or speed of the carriage M4001, obtained from the encoder signal E1020, into a register and provides the information to the CPU E1001. On the basis of this information, the CPU E1001 determines various parameters for controlling the CR motor E0001. A CR motor controller E2020 outputs a CR motor control signal E1036 under the control of the CPU E1001 via the CPU I/F E2001.

A sensor signal processor E2022 receives output sensing signals from, e.g., the PG sensor E0010, the PE sensor E0007, the ASF sensor E0009, and the GAP sensor E0008, and transmits these pieces of sensor information to the CPU E1001 in accordance with a mode determined by the control of the CPU E1001. The sensor signal processor E2022 also outputs a sensor signal E2052 to an LF/PG motor control DMA E2021.

Under the control of the CPU E1001 via the CPU I/F E2001, this LF/PG motor control DMA E2021 reads out a pulse motor driving table (RDPM) E2051 from a motor control buffer E2023 on the DRAM E2005 and outputs a pulse motor control signal E. In addition, the LF/PG motor control DMA E2021 outputs a pulse motor control signal E1033 by using the abovementioned sensor signal as a trigger of the control.

An LED controller E2030 outputs an LED driving signal E1038 under the control of the CPU E1001 via the CPU I/F E2001. A port controller E2029 outputs the head power ON signal E1022, the motor power ON signal E1023, and the power control signal E1024 under the control of the CPU E1001 via the CPU I/F E2001.

Figure 10:
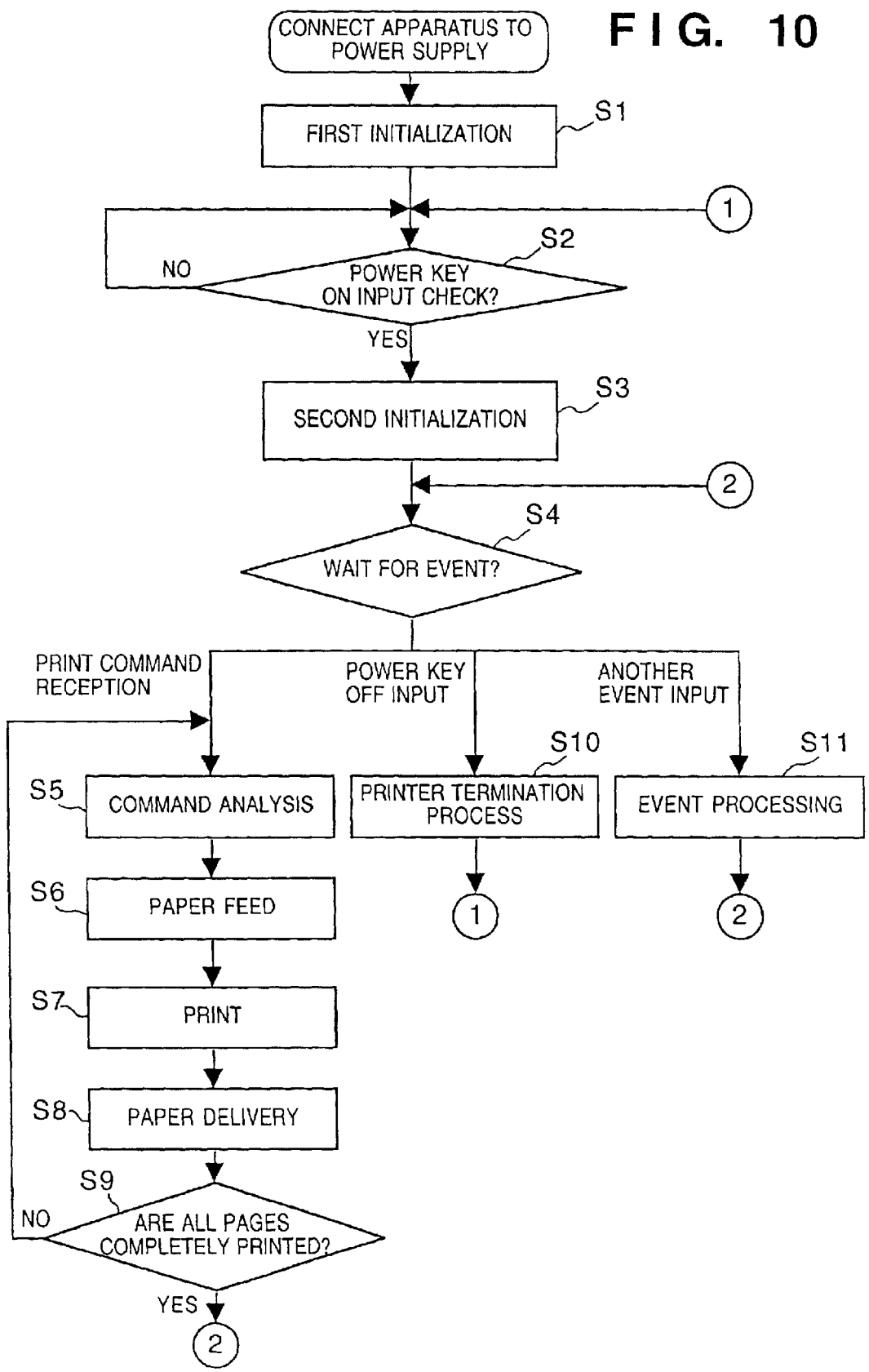
FIG. 10 is a flow chart showing the operation of the embodiment of the present invention.

The operation of the inkjet printing apparatus of this embodiment of the present invention constructed as above will be described below with reference to a flow chart in FIG. 10.

When this apparatus is connected to the AC power supply, in step S1 first initialization is performed for the apparatus. In this initialization, the electric circuit system including, e.g., the ROM and RAM of this apparatus is checked, thereby checking whether the apparatus can normally operate electrically.

In step S2, whether the power key E0018 on the upper case M1002 of the apparatus main body M1000 is pressed is checked. If the power key E0018 is pressed, the flow advances to step S3 to perform second initialization.

In this second initialization, the various driving mechanisms and the head system of this apparatus are checked. That is, whether the apparatus is normally operable is checked in initializing the various motors and loading head information.

In step S4, an event is waited for. That is, a command event from the external I/F, a panel key event by a user operation, or an internal control event with respect to this apparatus is monitored. If any of these events occurs, processing corresponding to the event is executed.

For example, if a printing command event is received from the external I/F in step S4, the flow advances to step S5. If a power key event by a user operation occurs in step S4, the flow advances to step S10. If another event occurs in step S4, the flow advances to step S11.

In step S5, the printing command from the external I/F is analyzed to determine the designated paper type, sheet size, printing quality, and paper feed method. Data indicating these determination results is stored in the RAM E2005 of the apparatus, and the flow advances to step S6.

In step S6, paper feed is started by the paper feed method designated in step S5. When the sheet is fed to a printing start position, the flow advances to step S7.

In step S7, printing is performed. In this printing, printing data supplied from the external I/F is once stored in the printing buffer. Subsequently, the CR motor E0001 is driven to start moving the carriage M4001 in the scanning direction, and the printing data stored in the print buffer E2014 is supplied to the printhead cartridge H1000 to print one line. When the printing data of one line is completely printed, the LF motor E0002 is driven to rotate an LF roller M3001 to feed the sheet in the sub-scan direction. After that, the above operation is repeatedly executed. When printing of the printing data of one page supplied from the external I/F is completed, the flow advances to step S8.

In step S8, the LF motor E0002 is driven to drive a sheet delivery roller M2003. Sheet feed is repeated until it is determined that the sheet is completely delivered from this apparatus. When this operation is completed, the sheet is completely delivered onto the sheet delivery tray M1004a.

In step S9, whether printing of all pages to be printed is completed is checked. If pages to be printed remain, the flow returns to step S5 to repeat the operation in steps S5 to S9 described above. When printing of all pages to be printed is completed, the printing operation is completed. After that, the flow returns to step S4 to wait for the next event.

In step S10, a printer termination process is performed to stop the operation of this apparatus. That is, to shut off the power supply to the various motors and the head, the operation transits to a state in which the power supply can be shut off. After that, the power supply is shut off, and the flow returns to step S4 to wait for the next event.

In step S11, event processing other than the above is performed. For example, processing corresponding to any of the diverse panel keys of this apparatus, a recovery command from the external I/F, or an internally occurring recovery event is performed. After the processing, the flow advances to step S4 to wait for the next event.

[First Embodiment]

Figure 11:
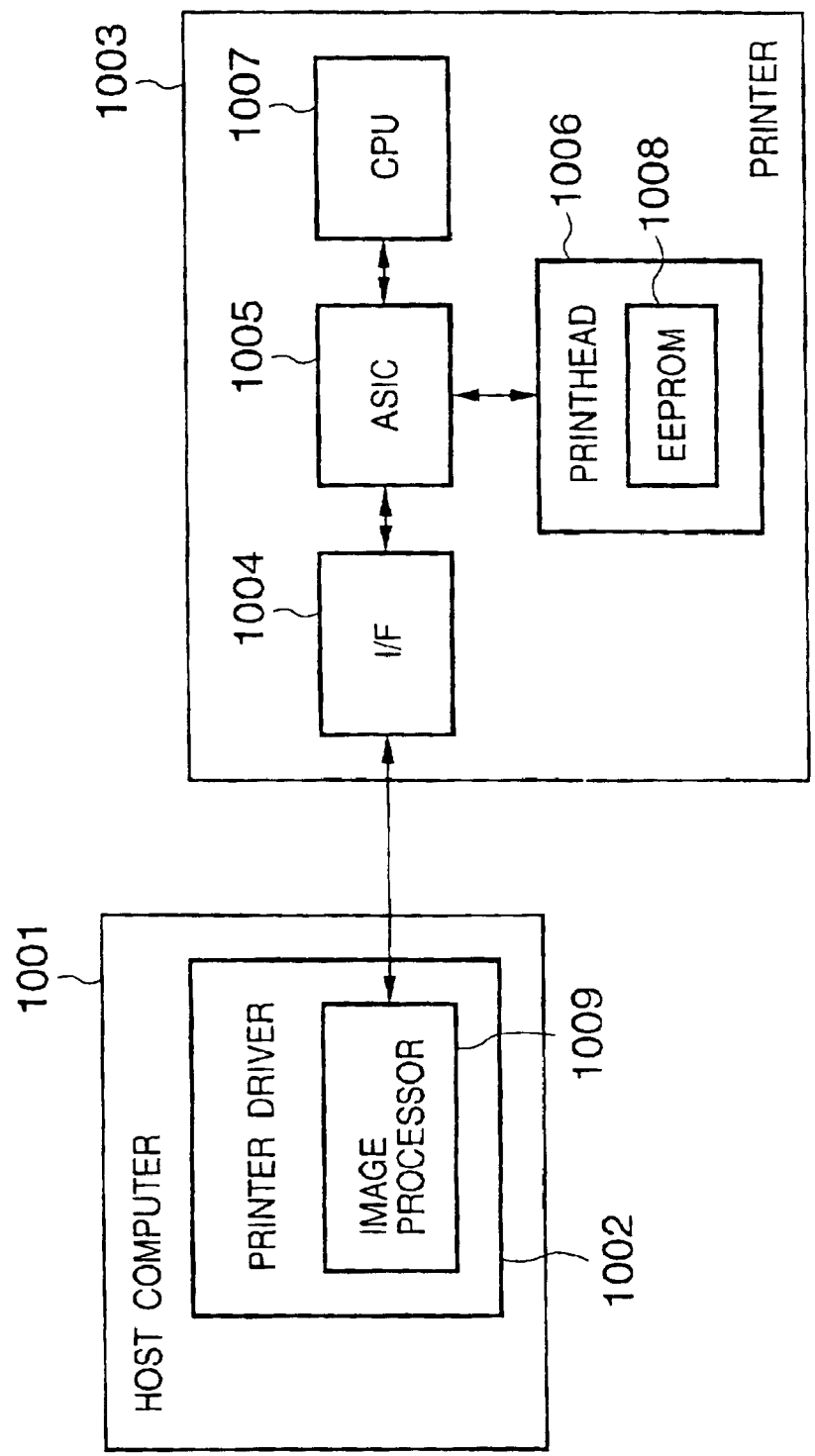
FIG. 11 is a block diagram showing the arrangement of a system constituted by a printer and host computer in the first embodiment.

FIG. 11 is a block diagram showing the arrangement of a system constituted by a printer and host computer in the first embodiment.

Reference numeral 1001 denotes a host computer which is connected to a printer 1003 and mainly generates data used for printing; and 1002, a printer driver. In the host computer 1001, an internal image processor 1009 (to be described later) in the printer driver 1002 converts image data output from an application into data which can be received by the printer 1003. Then, the host computer 1001 transmits the converted data to the printer 1003. With two-way communication, the host computer 1001 receives status information such as error information from the printer 1003, receives head information about a printhead such as head discharge amount information or head identification information that characterizes the present invention, and changes the processing method in accordance with the received information. Exchange of information and the processing method will be described in detail below.

An ASIC 1005 exchanges data with the host computer 1001 via an internal I/F 1004 of the printer 1003. A CPU 1007 exchanges a data signal and control signal with the ASIC 1005 to execute various control operations for the operation of the printer 1003. The ASIC 1005 exchanges a head control signal with a printhead 1006. The CPU 1007 receives each head control signal for the printhead 1006 via the ASIC 1005 to execute various head driving control operations. The printhead 1006 mounts an EEPROM 1008, and transfers its contents to the CPU 1007 via the ASIC 1005 at a predetermined timing.

An example of the memory map of the EEPROM 1008 mounted on the printhead 1006 will be explained with reference to FIG. 12.

Figure 12:
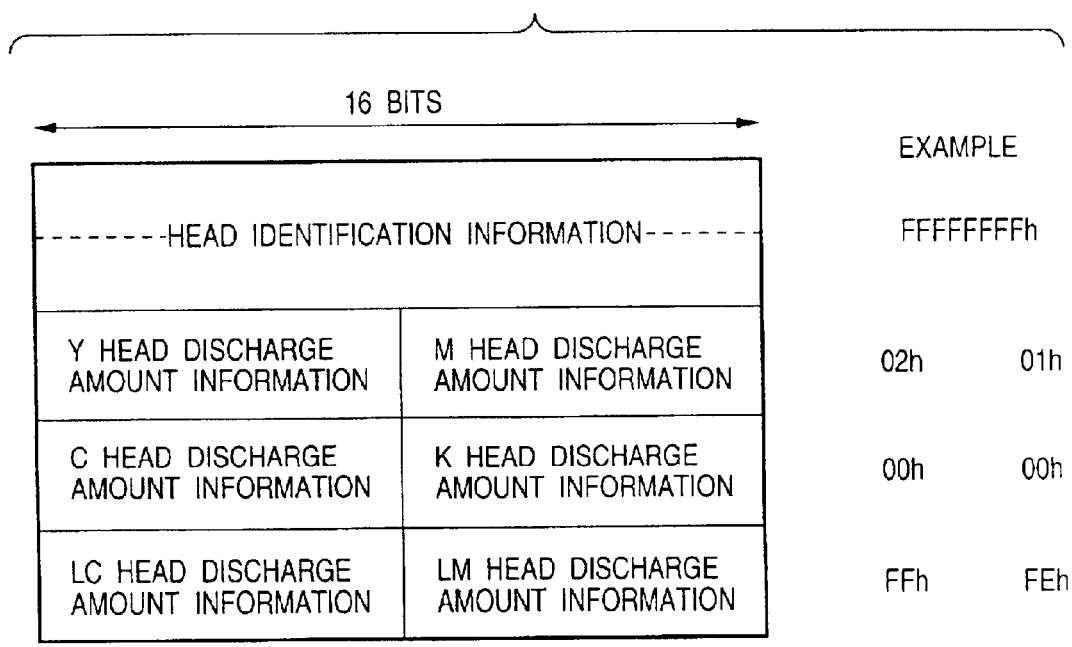
FIG. 12 is a view showing an example of the memory map of an EEPROM in the first embodiment.

FIG. 12 is a view showing an example of the memory map of the EEPROM in the first embodiment.

As shown in FIG. 12, the EEPROM 1008 is mapped with 1 word=16-bit width, and a variable data length is assigned in accordance with information. Head identification information is 32-bit data, and information ($2^{32}$=4,294,967,296 patterns) expressible by this data length is stored as information unique to each head. In the example shown in FIG. 12, identification information "FFFFFFFFh" unique to the head is input to the EEPROM 1008.

Discharge amount information for each of Y, M, C, K, LC, and LM colors is 8-bit data. The discharge amount information represents a discharge amount by five stages −2 (FEh), −1 (FFh), 0 (00h), +1 (01h), and +2 (02h) such that the standard discharge amount is 0, a discharge amount smaller than the standard one is negative, and a larger discharge amount is positive. In the example shown in FIG. 12, Y and M printheads have discharge amounts larger than the standard discharge amount, C and K printheads have discharge amounts equal to the standard discharge amount, and LC and LM printheads have discharge amounts smaller than the standard discharge amount.

The EEPROM 1008 stores only information concerning the first embodiment in FIG. 12, but the information is not limited to this. For example, printhead driving conditions may be written to control each printhead by the printer using optimal driving conditions based on the driving conditions. Alternatively, registration information of a printhead may be written to adjust the position of the printhead based on the registration information. Alternatively, undischargeable nozzle information of a printhead may be written, and various pieces of information may be written within the memory capacity of the EEPROM 1008 in order to interpolate an undischargeable nozzle by other nozzles.

In some cases, head information in the EEPROM 1008 permits not any change but only read after written in shipping a printhead. In some cases, head information permits write in consideration of temporal changes in the discharge amount of a printhead. For descriptive convenience, head information is written only in shipping, and can only be read out.

The arrangement of the internal functions of the image processor 1009 in the printer driver 1002 of the host computer 1001 will be explained with reference to FIG. 13.

Figure 13:
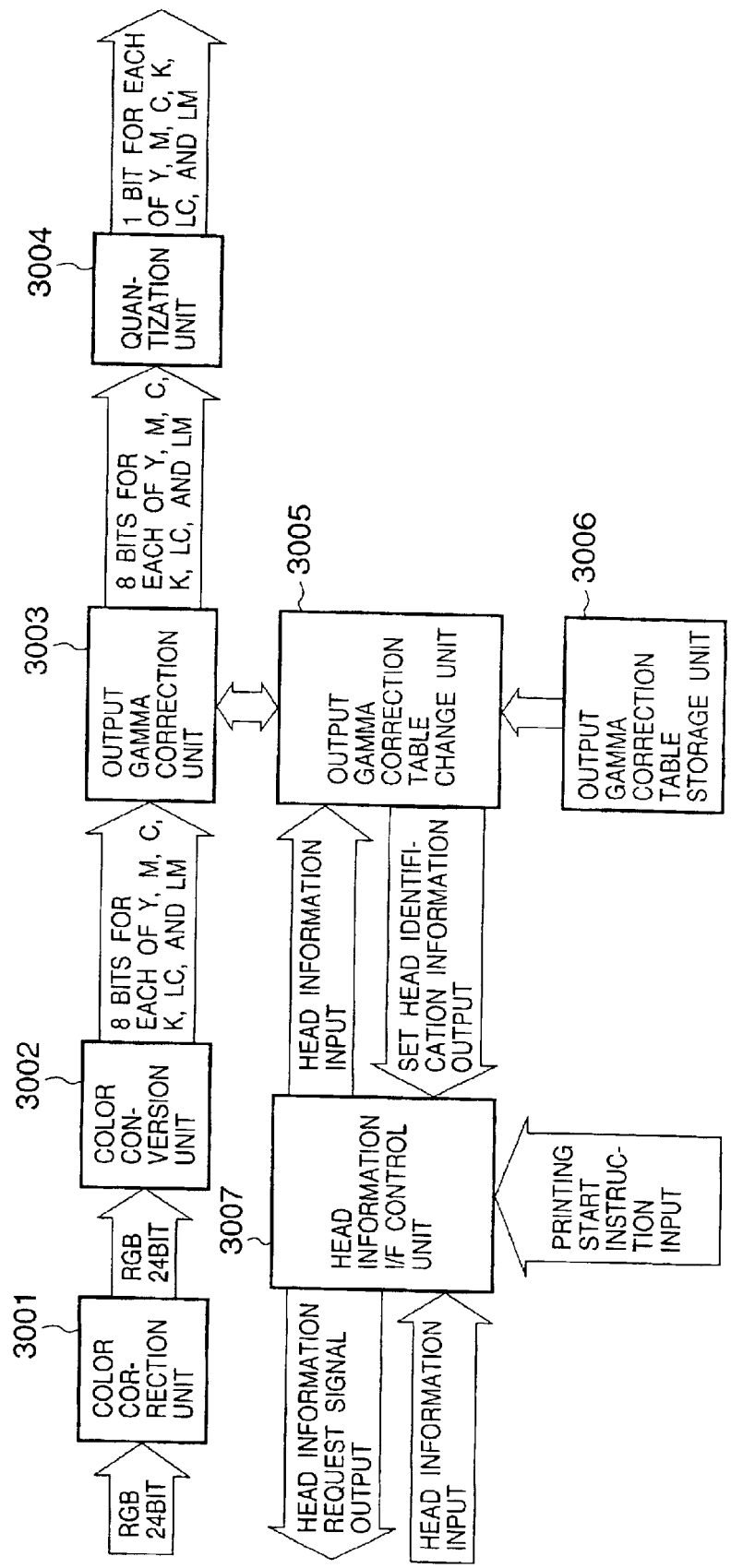
FIG. 13 is a block diagram showing the functional arrangement of an image processor in the first embodiment.

FIG. 13 is a block diagram showing the functional arrangement of the image processor in the first embodiment.

Image data of 24 bits made up of 8-bit R, G, and B data is input to a color correction unit 3001. The color correction unit 3001 converts the input R, G, and B data into 24-bit R, G, and B data using three-dimensional LUT conversion. In this case, the color correction unit 3001 converts the input color space into a standard color space to unify color reproduction for each input/output device and realize color reproduction or memory color reproduction desirable for the user. A color conversion unit 3002 also uses a three-dimensional LUT to convert the color-corrected R, G, and B values into 48-bit data made up of 8-bit Y, M, C, K, LC, and LM data that constitutes the color space of a printer serving as an output device. An output gamma correction unit 3003 performs output gamma correction independently using a one-dimensional LUT for each color. This output gamma correction unit 3003 corrects output gamma characteristics corresponding to the discharge amounts of respective printheads.

Output gamma characteristics for respective discharge amounts will be explained with reference to FIG. 14.

Figure 14:
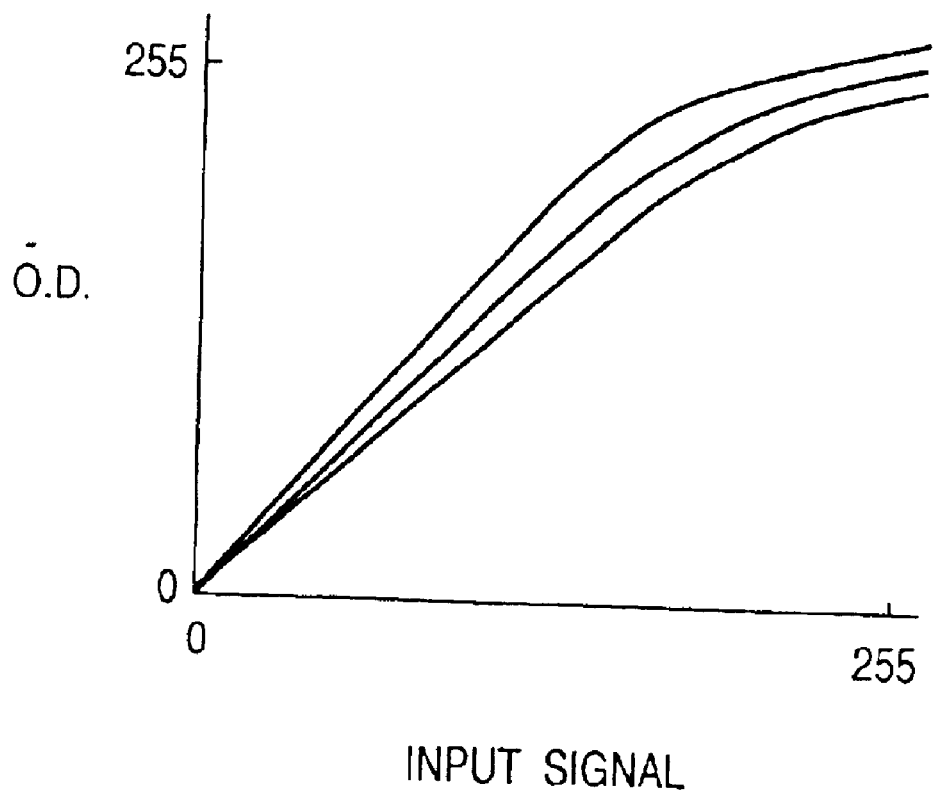
FIG. 14 is a graph showing output gamma characteristics for respective discharge amounts in the first embodiment.

FIG. 14 is a graph showing output gamma characteristics for respective discharge amounts in the first embodiment.

Figure 15:
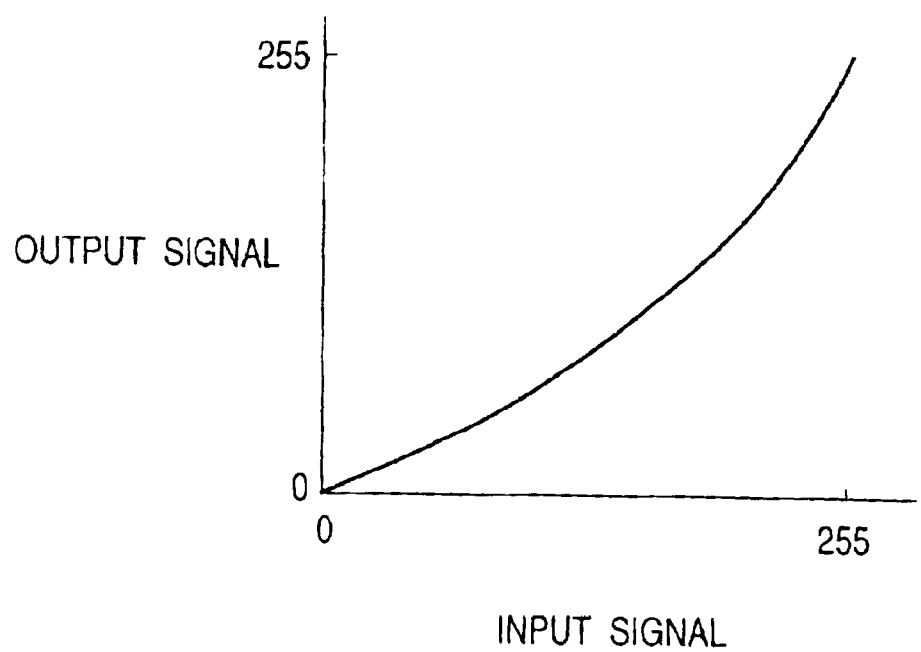
FIG. 15 is a graph for explaining the characteristic of an output gamma correction table in the first embodiment.

The abscissa represents an 8-bit (0–255) independent signal value of each color that represents multiple gray levels before output gamma correction, and the ordinate represents a reflection optical density value (O.D. value) upon outputting a patch with that signal value. As a matter of course, the O.D. value of each tone level is high for a large discharge amount, and is low for a small discharge amount. However, the ratio changes depending on the tone level. Output gamma correction adopts an output gamma correction table as shown in FIG. 15 so as to give the O.D. value a linear characteristic with respect to an input in consideration of the output gamma characteristics of the printer 1003.

In the first embodiment, this output gamma correction table is prepared for the discharge amount of each printhead, and stored in an output gamma correction table storage unit 3006 in FIG. 13. The types of output gamma correction tables may be equal in number to the stages (five) of discharge amount information stored in the EEPROM 1008 of the printhead 1006. Alternatively, the types of output gamma correction tables may be smaller in number (e.g., three), and an output gamma correction table may be created by interpolation calculation.

The output gamma correction table is used to correct an output characteristic influenced by variations in discharge amount in the first embodiment, but the present invention is not limited to this. For example, the color correction unit 3001 for performing color processing and the color conversion unit 3002 may comprise LUTs in accordance with discharge amounts, and the output characteristic may be corrected by switching these correction tables.

When an output gamma correction table change unit 3005 receives head identification information from the printer 1003 via a head information I/F control unit 3007, the unit 3005 determines whether to change a currently set output gamma correction table to another one in accordance with the head identification information, and changes the table if necessary. The processing contents of the two processing blocks will be described later.

A quantization unit 3004 receives 8-bit data of each color that has undergone output gamma correction, and quantizes the received data into data having the number of tone levels expressible by the printer 1003, e.g., 1-bit binary data in the example of FIG. 13. In general, this quantization employs dither processing or error diffusion processing capable of pseudo halftone expression.

The operation between the host computer 1001 and the printer 1003 in the first embodiment will be explained with reference to FIG. 16.

Figure 16:
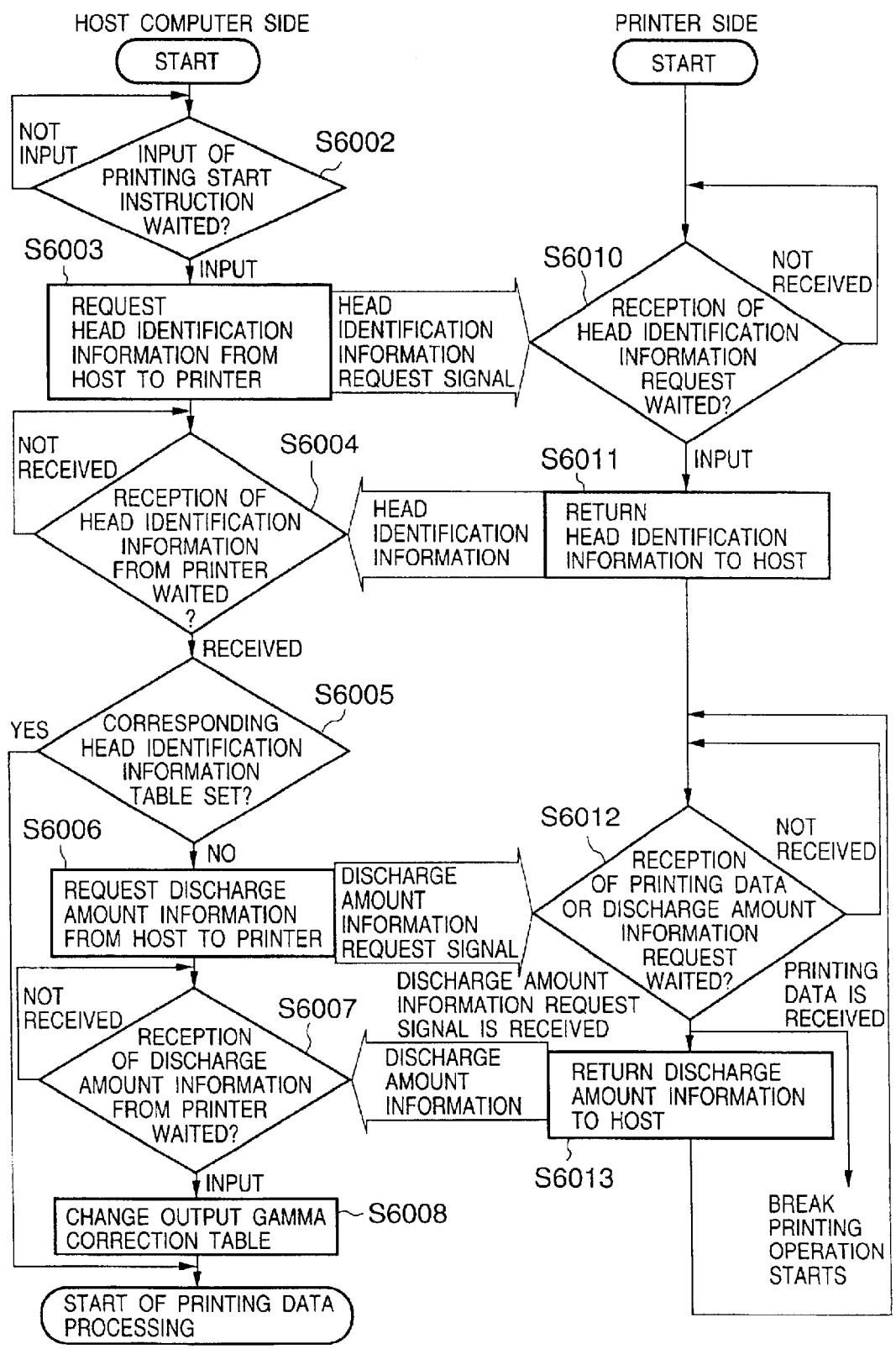
FIG. 16 is a flow chart showing the operation between the host computer and the printer in the first embodiment.

FIG. 16 is a flow chart showing the operation between the host computer and the printer in the first embodiment.

In step S6002, the host computer 1001 enters an input standby state for a printing start instruction. If the host computer 1001 receives a printing start instruction, the host computer 1001 transmits to the printer 1003 in step S6003 a head identification information request signal for requesting head identification information of the printhead 1006 currently mounted on the printer 1003. This processing is executed by the head information I/F control unit 3007 in FIG. 13.

In step S6010, the printer 1003 enters a reception standby state for a head identification information request signal from the host computer 1001. If the printer 1003 receives the head identification information request signal from the host computer 1001, the printer 1003 shifts to step S6011 to return head identification information to the host computer 1001.

After the host computer 1001 transmits the head identification information request signal to the printer 1003 in step S6003, the host computer 1001 enters a reception standby state for head identification information. If the host computer 1001 receives the head identification information from the printer 1003, the host computer 1001 shifts to step S6005.

In step S6005, the host computer 1001 checks whether a head identification information output correction table corresponding to the received head identification information is set. In this processing, the head information I/F control unit 3007 inquires of the output gamma correction table change unit 3005 head identification information corresponding to the currently set output gamma correction table. For this inquiry, the output gamma correction table change unit 3005 returns head identification information corresponding to the set output gamma correction table. If the head identification information returned by the output gamma correction table change unit 3005 coincides with the head identification information received from the printer 1003 (YES in step S6005), the head information I/F control unit 3007 starts printing data processing.

If NO in step S6005, i.e., head identification information different from the one received from the printer 1003 is set in the output gamma correction table, the host computer 1001 transmits to the printer 1003 in step S6006 a discharge amount information request signal for requesting discharge amount information of the printhead 1006.

In step S6011, the printer 1003 returns head identification information. In step S6012, the printer 1003 enters a reception standby state for printing data or a discharge amount information request signal. If the printer 1003 receives the discharge amount information request signal from the host computer 1001, the printer 1003 returns discharge amount information of each color in the EEPROM 1008 of the printhead 1006 to the host computer 1001 in step S6013. If the printer 1003 receives printing data, it executes printing operation based on the printing data.

The host computer 1001 transmits a discharge amount information request signal to the printer 1003 in step S6006, and then enters in step S6007 a reception standby state for discharge amount information from the printer 1003. If the host computer 1001 receives the discharge amount information, the host computer 1001 changes the output gamma correction table in step S6008. The output gamma correction table is changed by the output gamma correction table change unit 3005 in FIG. 13 by extracting a corresponding table from the output gamma correction table storage unit 3006, and setting the table in the output gamma correction unit 3003. The arrangement of tables stored in the output gamma correction table storage unit 3006 is shown in FIG. 17.

Figure 17:
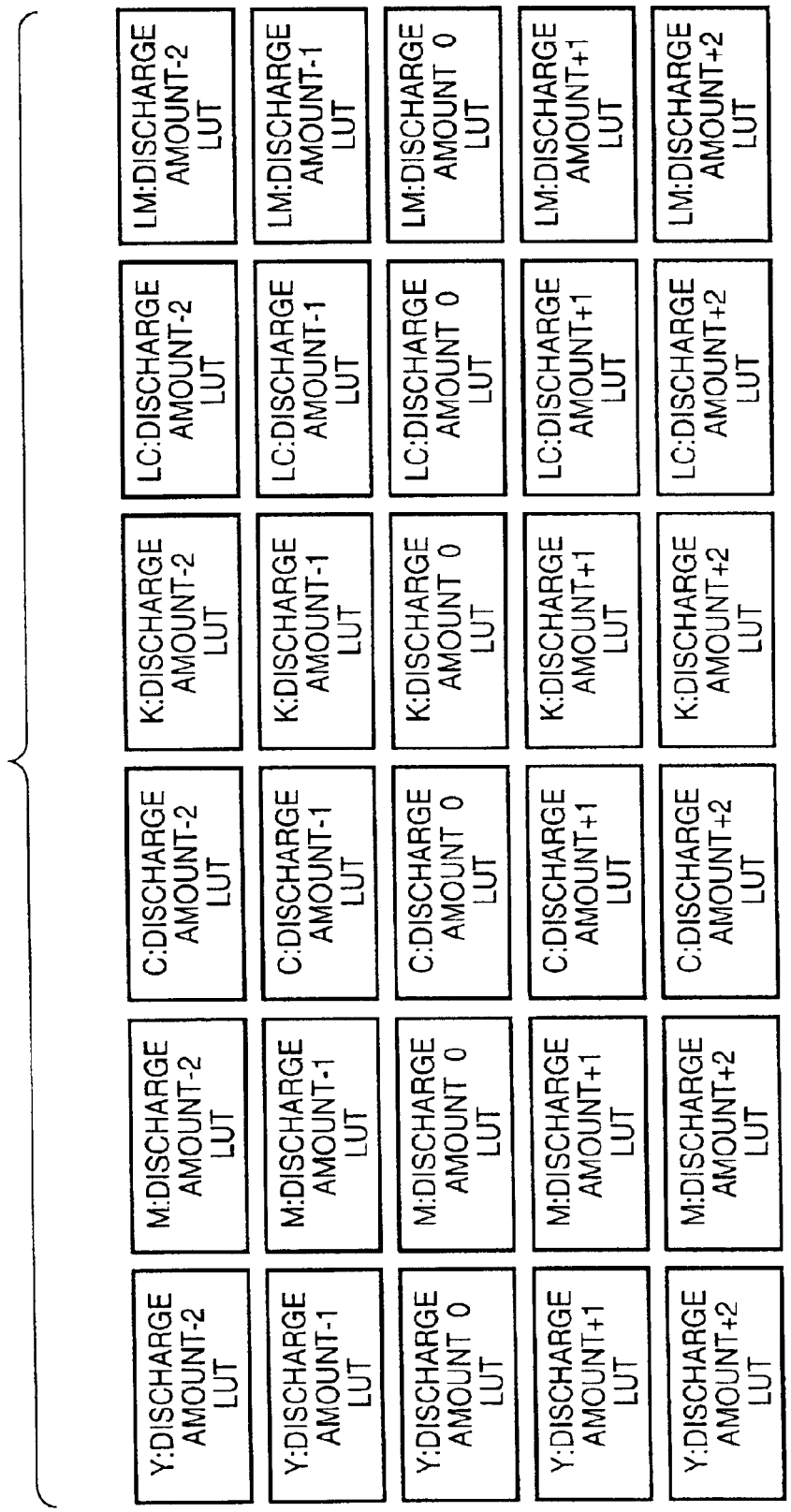
FIG. 17 is a view showing an example of the output gamma correction table in the first embodiment.

FIG. 17 is a view showing an example of the output gamma correction table in the first embodiment.

As shown in FIG. 17, the output gamma correction table includes output gamma correction LUTs for all the discharge amount stages, e.g., five stages of each color.

In the processing flow shown in FIG. 16, the host computer 1001 and printer 1003 exchange head information to change the processing parameters of the image processor 1009 in the printer driver 1002.

As described above, according to the first embodiment, discharge amount information of the printhead 1006 written in the EEPROM 1008 of the printhead 1006 in advance, or head identification information unique to the printhead 1006 is loaded to the host computer 1001, and reflected on the processing parameters of the image processor 1009 in the printer driver 1002 in order to avoid adverse effects on an image due to variations in the discharge amount of each printhead of the printer 1003. Thus, a high-quality image can be output even with slight variations in discharge amount without varying the tint of the image.

The processing parameters of the image processor 1009 are changed only when head identification information is different from the currently set one, i.e., another printhead is mounted on the printer 1003. This minimizes change processing to minimize the processing load of the host computer 1001.

This also minimizes image degradation caused by variations in discharge amount in manufacturing a printhead. Further, the margin for variations in the discharge amount of the printhead increases, which improves the yield of the printhead and reduces the head cost.

Discharge amount information of the printhead is written in shipping a printhead, and the value is automatically exchanged between the printer and the host computer to automatically correct image processing. The user need not manually output a detection pattern or scan the pattern with a scanner in order to correct variations in the discharge amount of the head of the printer. This is convenient for the user.

(Second Embodiment)

In the characteristic feature of the second embodiment, a host computer 1001 and printer 1003 exchange data at the same timing as exchange of a printhead 1006, unlike the first embodiment. The printer 1003 of the second embodiment allows dismounting the printhead 1006 from the carriage of the main body of the printer 1003.

The user exchanges the printhead in the following cases (1), (2), and (3).

(1) The printhead is exchanged with a new one due to the limit of the service life.

(2) When the printer is kept unused for a long time, the printhead is dismounted and stored in its storage box. In using the printer, the printhead is mounted again.

(3) In the use of a scanner mountable on the same carriage, the printhead is exchanged with the scanner.

In case (1), a printhead B different from a printhead A in use is mounted.

In cases (2) and (3), the same printhead is basically mounted.

In cases (1) and (3), the printhead is exchanged while the printer is kept on. In case (2), the printer is turned off. For the next use, the printer is turned on, and then the printhead is mounted.

Case (1) will be exemplified.

The contents of head information written in an EEPROM 1008 are the same as in the first embodiment, and a description thereof will be omitted.

The arrangement of the internal functions of an image processor 1009 in a printer driver 1002 of the host computer 1001 will be explained with reference to FIG. 18.

Figure 18:
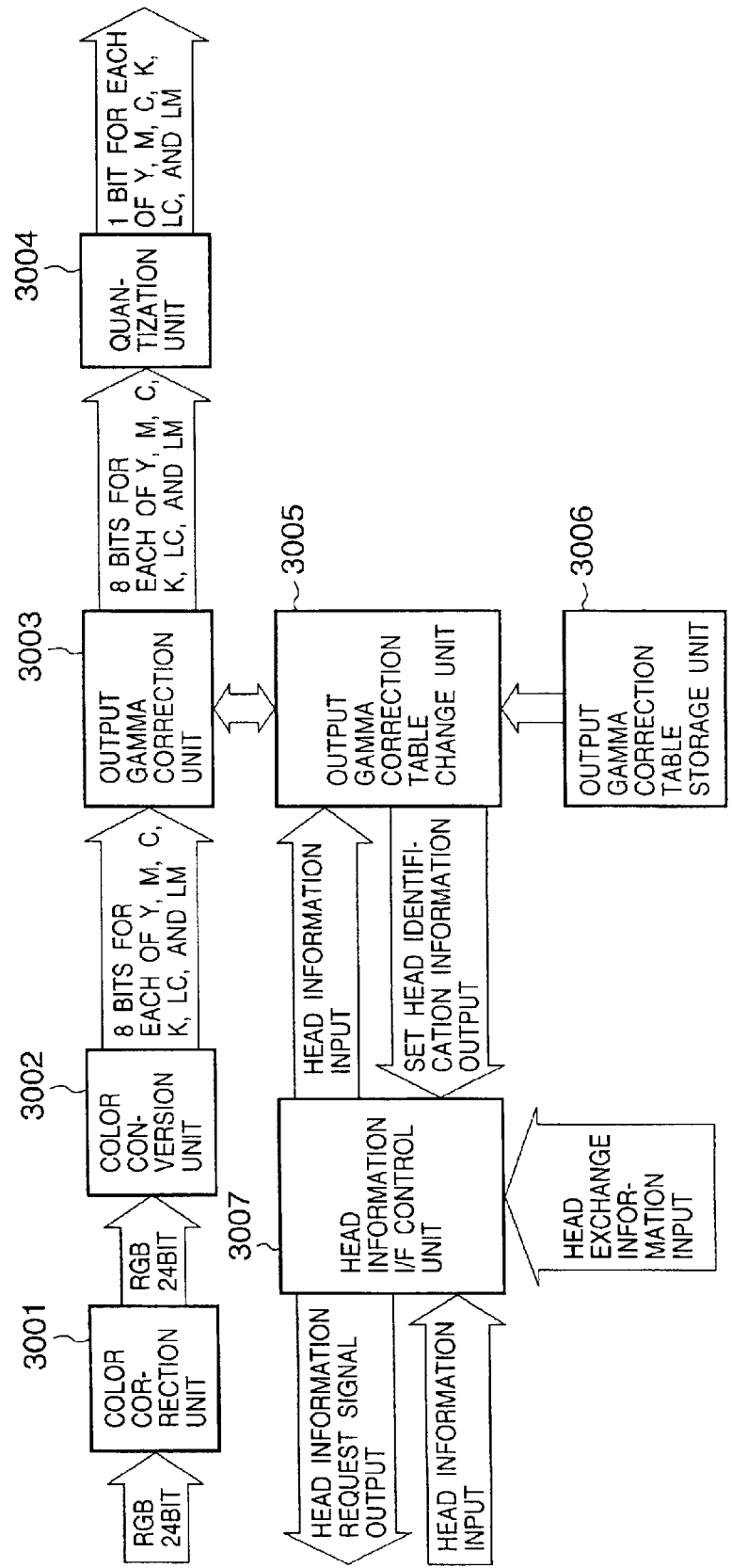
FIG. 18 is a block diagram showing the functional arrangement of an image processor in the second embodiment.

FIG. 18 is a block diagram showing the functional arrangement of the image processor in the second embodiment.

In the functional arrangement of the image processor according to the second embodiment, the same reference numerals as in the first embodiment denote the same parts, and a description thereof will be omitted.

The basic arrangement is the same as the functional arrangement of the image processor in the first embodiment in FIG. 13 except that a head information I/F control unit 3007 receives not a printing start instruction but head exchange information representing that the head was exchanged, which is a trigger signal for starting acquiring head information.

The operation between the host computer 1001 and the printer 1003 will be explained with reference to FIG. 19.

Figure 19:
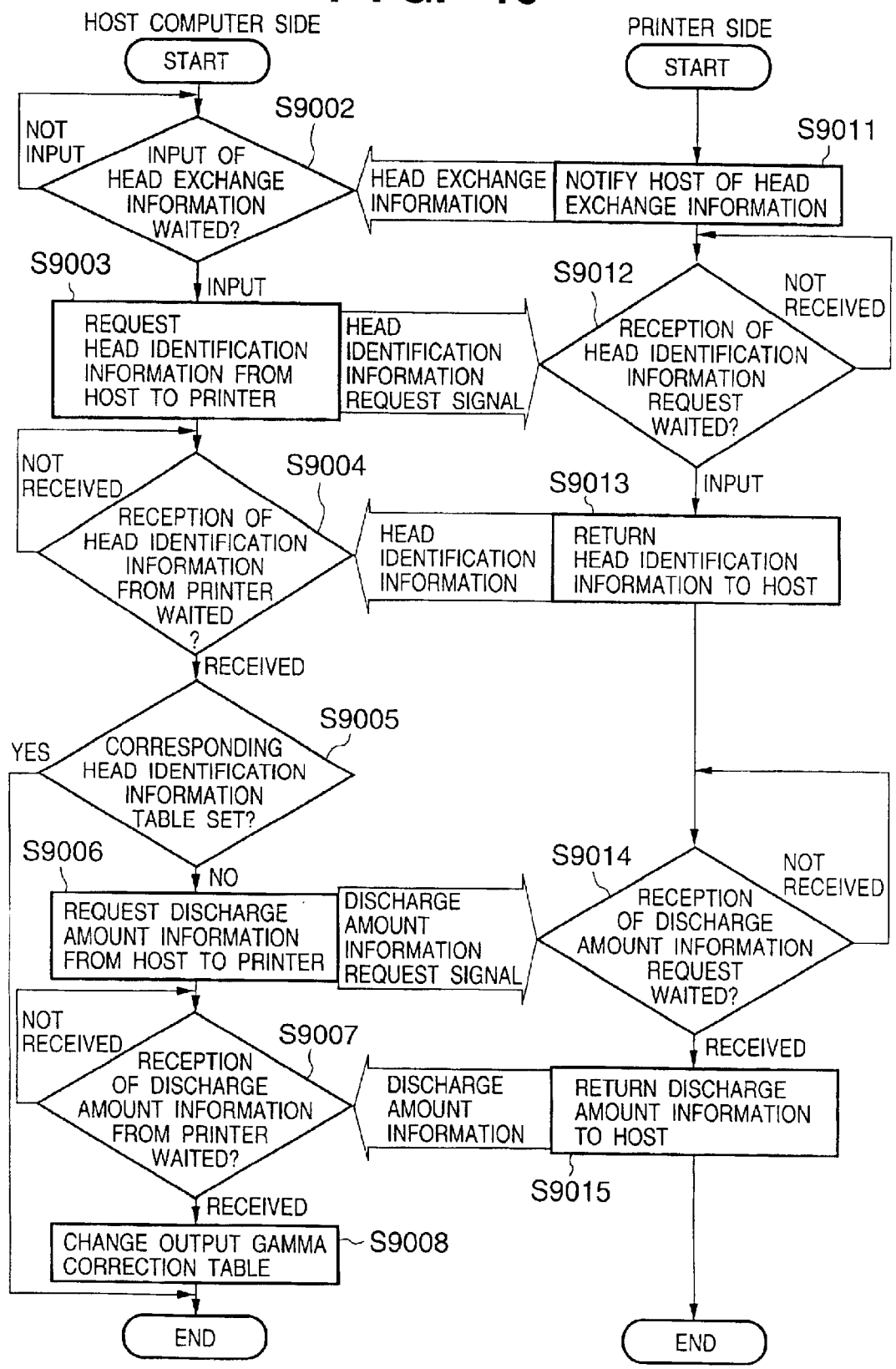
FIG. 19 is a flow chart showing the operation between the host computer and the printer in the second embodiment.

FIG. 19 is a flow chart showing the operation between the host computer and the printer in the second embodiment.

In step S9002, the host computer 1001 enters an input standby state for head exchange information. If the printhead 1006 has been exchanged in the printer 1003, the printer 1003 transmits head exchange information in step S9011. This means that the head exchange information is input to the head information I/F control unit 3007 in FIG. 18.

In step S9003, the host computer 1001 transmits a head identification information request signal to the printer 1003. This processing is executed by the head information I/F control unit 3007 in FIG. 18. After the printer 1003 notifies the host computer 1001 of the head exchange information in step S9011, the printer 1003 enters a reception standby state for a head identification information request signal from the host computer 1001. If the printer 1003 receives the head identification information request signal from the host computer 1001, the printer 1003 shifts to step S9013 to return head identification information to the host computer 1001.

In step S9004, the host computer 1001 enters a reception standby state for head identification information from the printer 1003. If the host computer 1001 receives the head identification information from the printer 1003, the host computer 1001 shifts to step S9005.

In step S9005, the host computer 1001 checks whether a head identification information table corresponding to the received head identification information is set. In this processing, similar to the first embodiment, the head information I/F control unit 3007 inquires of an output gamma correction table change unit 3005 head identification information corresponding to the currently set output gamma correction table. For this inquiry, the output gamma correction table change unit 3005 returns head identification information corresponding to the set output gamma correction table. If the head identification information returned by the output gamma correction table change unit 3005 coincides with the head identification information input from the printer 1003 (YES in step S9005), the head information I/F control unit 3007 ends the processing of the host computer 1001.

If NO in step S9005, i.e., head identification information different from the one received from the printer 1003 is set in the output gamma correction table, the host computer 1001 transmits a discharge amount information request signal to the printer 1003 in step S9006.

In step S9014, the printer 1003 enters a reception standby state for a discharge amount information request signal. If the printer 1003 receives the discharge amount information request signal from the host computer 1001, the printer 1003 returns discharge amount information of each color in the EEPROM 1008 of the printhead 1006 to the host computer 1001 in step S9015.

In step S9007, the host computer 1001 enters a reception standby state for discharge amount information from the printer 1003. If the host computer 1001 receives the discharge amount information, the host computer 1001 changes the output gamma correction table in step S9008. The output gamma correction table is changed by the output gamma correction table change unit 3005 in FIG. 18 by extracting a corresponding table from an output gamma correction table storage unit 3006, and setting the table in an output gamma correction unit 3003.

In the processing flow shown in FIG. 19, the host computer 1001 and printer 1003 exchange head information to change the processing parameters of the image processor 1009 in the printer driver 1002.

As described above, according to the second embodiment, discharge amount information of the printhead 1006 written in the EEPROM 1008 of the printhead 1006 in advance, or head identification information unique to the printhead 1006 is loaded to the host computer 1001 at the exchange timing of the printhead 1006 in the printer 1003, and reflected on the processing parameters of the image processor 1009 in the printer driver 1002 in order to avoid adverse effects on an image due to variations in the discharge amount of each printhead of the printer 1003. Thus, a high-quality image can be output even with slight variations in discharge amount without varying the tint of the image.

The processing parameters of the image processor 1009 in the second embodiment are changed only when exchange of the printhead 1006 is detected, and head identification information different from the currently set one is input. As a result, the processing load of the host computer 1001 becomes smaller than in the first embodiment.

The second embodiment has described the exchange timing of data concerning the printhead between the host computer 1001 and the printer 1003 by exemplifying exchange of the printhead 1006. However, the present invention is not limited to this. For example, data may be exchanged before the start of the next printing operation after exchange of the printhead 1006 is detected. That is, whether the printhead 1006 has been exchanged is determined prior to the start of printing operation, and if the printhead 1006 has been exchanged, data concerning the printhead is exchanged between the host computer 1001 and the printer 1003.

Case (1) wherein the printhead is exchanged with a new one has been exemplified. This embodiment can also be applied to cases (2) and (3). That is, processing shown in the flow chart of FIG. 19 is executed based on information that the head is mounted or the head is dismounted and then mounted again. By performing the processing in FIG. 19 based on mounting/dismounting of the printhead, the second embodiment can cope with cases (2) and (3).

[Third Embodiment]

In the third embodiment, head information is transferred by one-way communication between a host computer 1001 and a printer 1003 in which data can be communicated only from the host computer 1001 to the printer 1003, unlike the first embodiment. More specifically, head information is printed by the printer 1003, scanned by the user, and input via the UI (User Interface) of the host computer 1001.

The arrangement of the internal functions of an image processor 1009 in a printer driver 1002 of the host computer 1001 will be explained with reference to FIG. 20.

Figure 20:
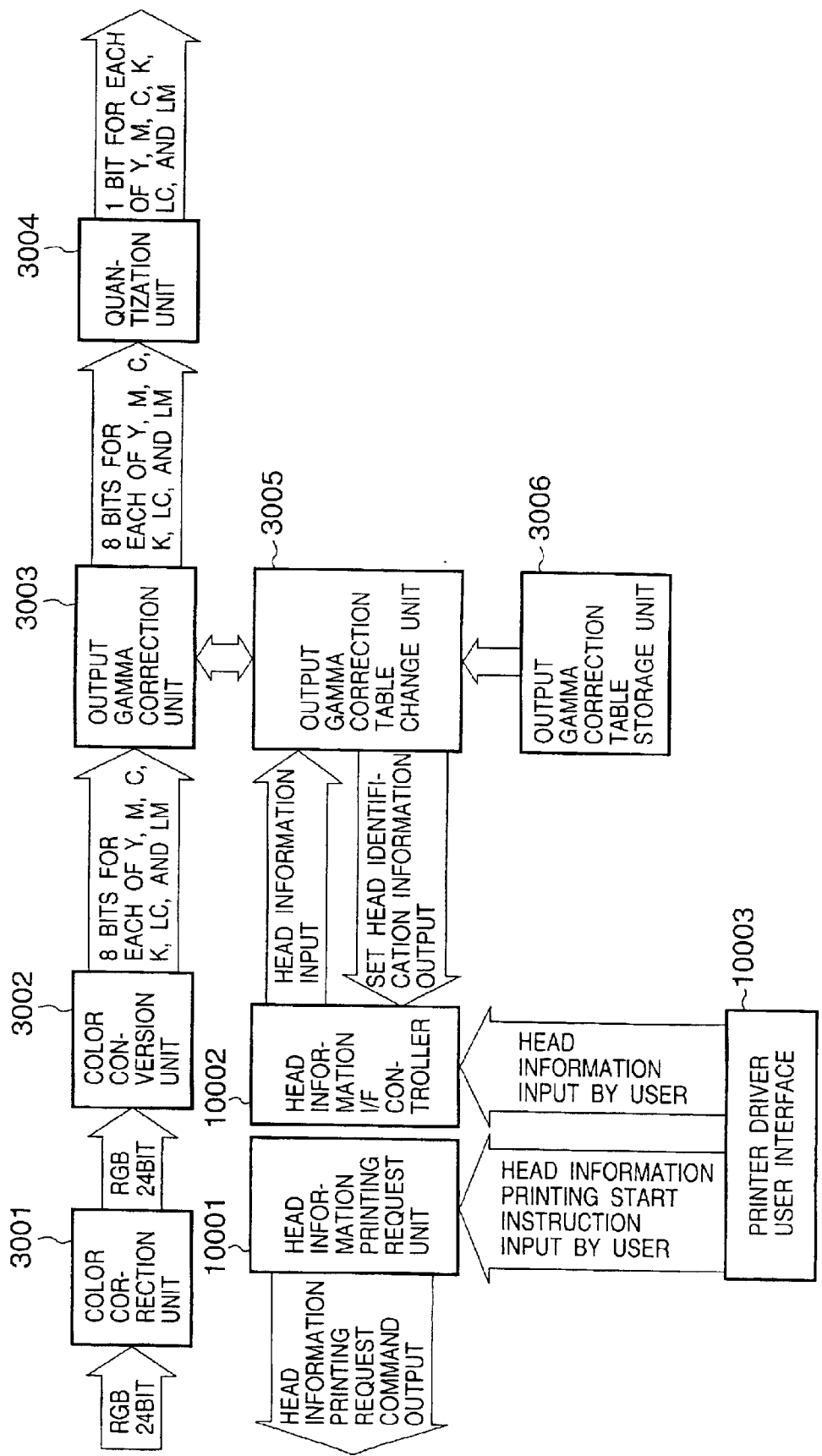
FIG. 20 is a block diagram showing the functional arrangement of an image processor in the third embodiment.

FIG. 20 is a block diagram showing the functional arrangement of the image processor in the third embodiment.

In the functional arrangement of the image processor according to the third embodiment, the same reference numerals as in the first embodiment denote the same parts, and a description thereof will be omitted.

The basic arrangement is the same as the functional arrangement of the image processor in the first embodiment in FIG. 13 except that the image processor further comprises a printer driver user interface 10003 for causing the user to input information, and a head information printing request unit 10001 for requesting the printer 1003 to print head information.

The operation between the host computer 1001 and the printer 1003 will be explained with reference to FIG. 21.

Figure 21:
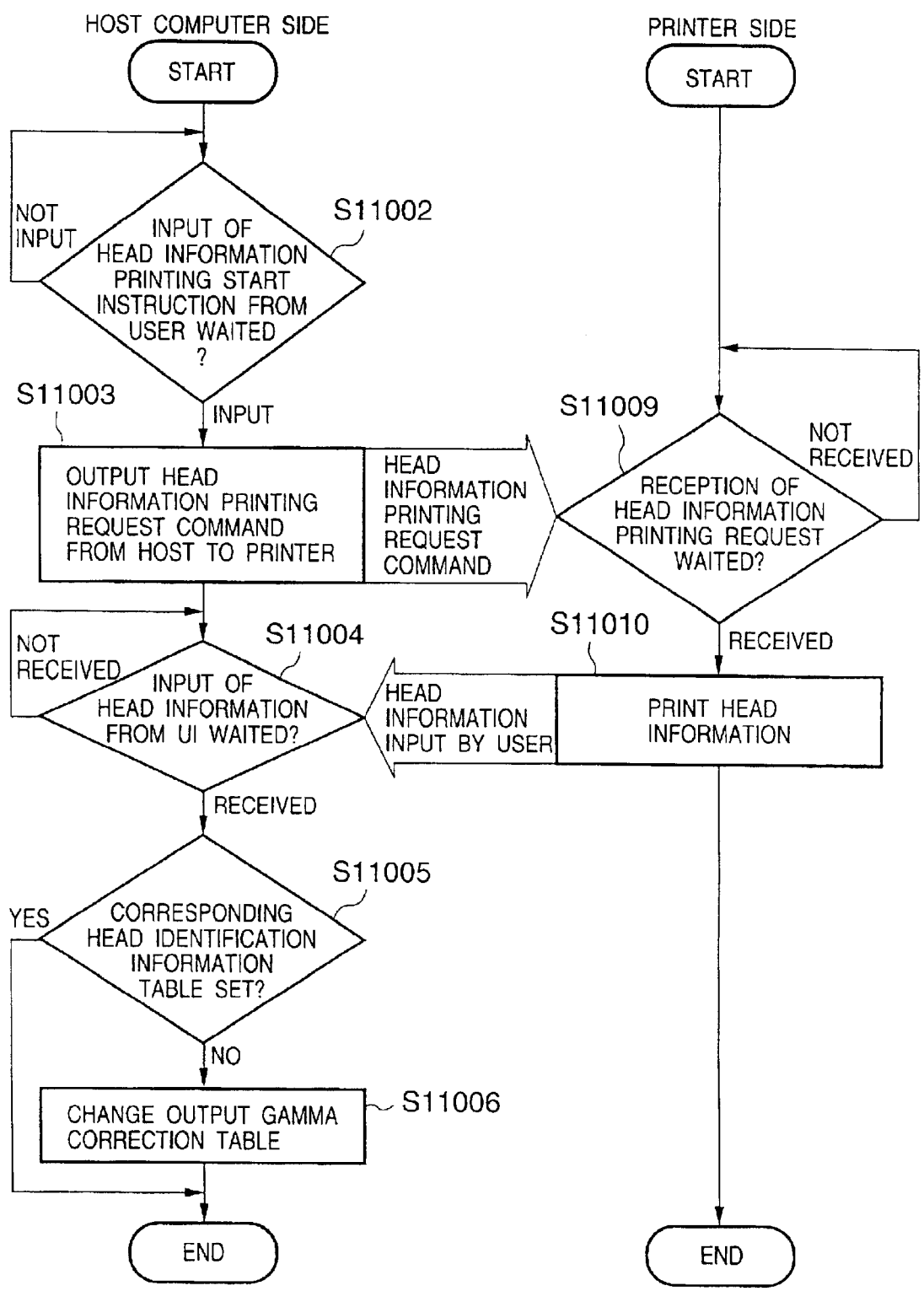
FIG. 21 is a flow chart showing the operation between the host computer and the printer in the third embodiment.

FIG. 21 is a flow chart showing the operation between the host computer and the printer in the third embodiment.

Figure 22:
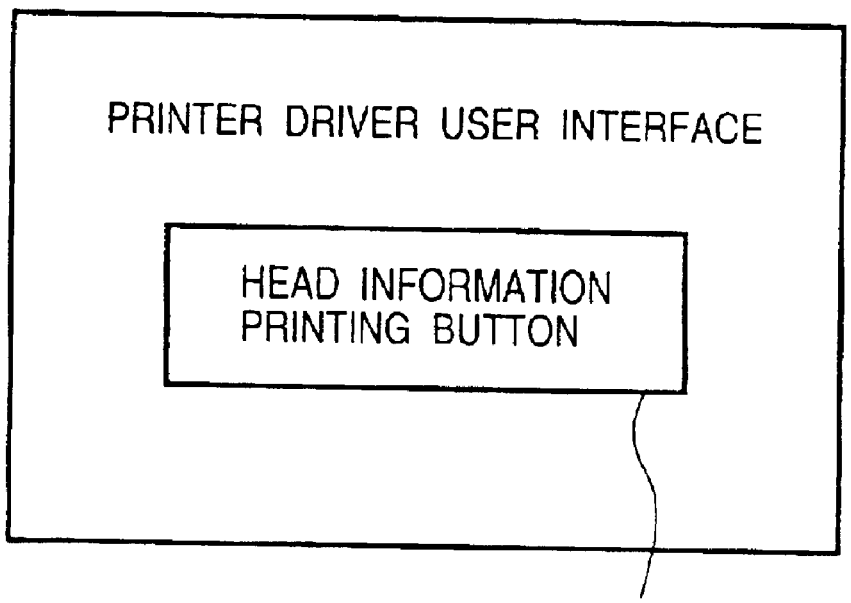
FIG. 22 is a view showing a user interface for instructing the start of printing head information in the third embodiment.

In step S11002, the host computer 1001 enters an input standby state for a head information printing start instruction from the user. The user inputs a head information printing start instruction via the printer driver user interface 10003 shown in FIG. 20. When the host computer 1001 and printer 1003 cannot bidirectionally communicate with each other, the host computer 1001 cannot detect whether a printhead has been exchanged. For this reason, when the user exchanges a printhead, the user starts printing head information by manual operation. At the start of printing, the user touches a head information printing button 12001 on the printer driver user interface 10003 as shown in FIG. 22 to input a head information printing start instruction.

If the head information printing start instruction is input in step S11002, the host computer 1001 issues a head information printing request command to the printer 1003. This processing is executed by the head information printing request unit 10001 in FIG. 20.

Figure 23:
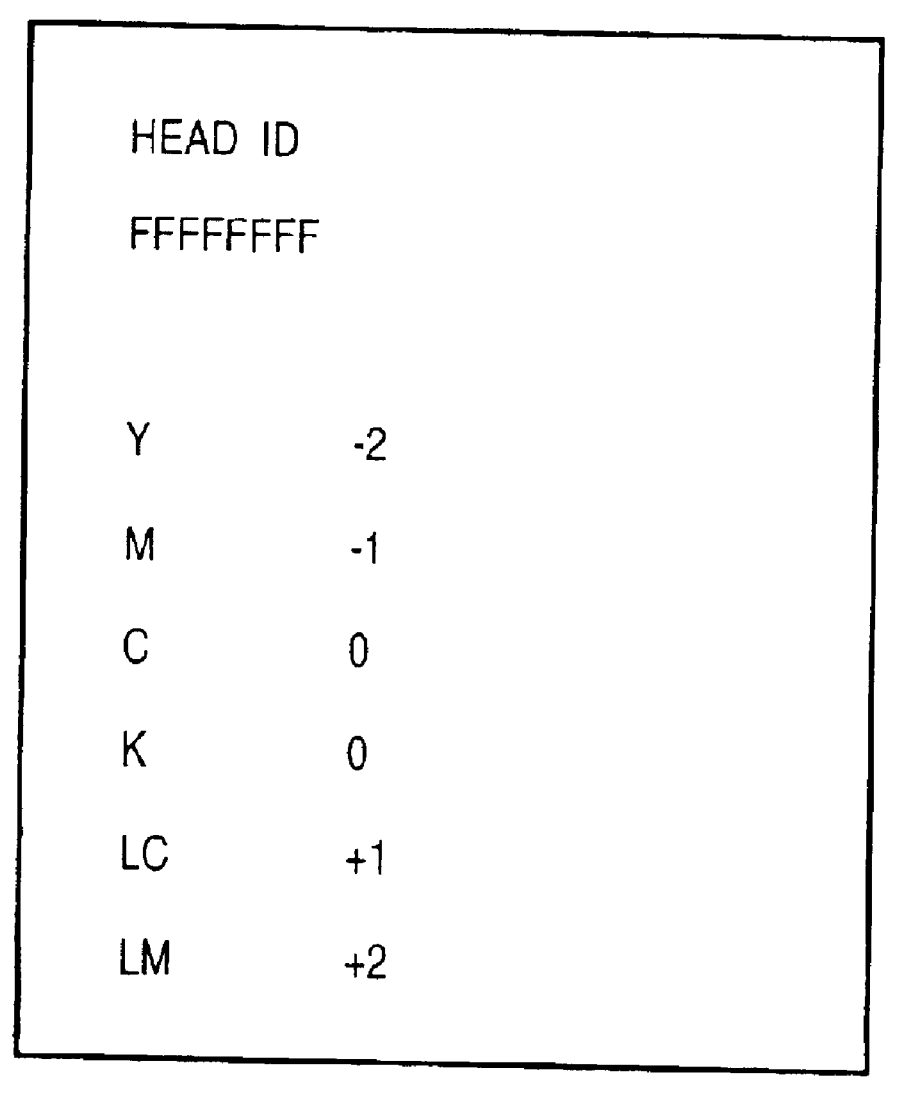

In step S11009, the printer 1003 enters a reception standby state for a head information printing request command. If the printer 1003 receives the head information printing request command from the host computer 1001, the printer 1003 shifts to step S11010 to print head information on a printing medium set on the sheet feeder of the printer 1003. FIG. 23 shows a printing example when the printer 1003 prints head information.

In step S11004, the host computer 1001 enters an input standby state for head information from the printer driver user interface 10003. The user refers to the output printing medium having the head information shown in FIG. 23, and inputs the head information using the printer driver user interface for inputting head information shown in FIG. 24. If head information is input by the user, the host computer 1001 shifts to step S11005.

In step S11005, the host computer 1001 checks whether a head information table corresponding to the received head information (head identification information) is set. In this processing, a head information I/F controller 11002 in FIG. 20 inquires of an output gamma correction table change unit 3005 head information corresponding to the currently set output gamma correction table. For this inquiry, the output gamma correction table change unit 3005 returns head information corresponding to the set output gamma correction table. If the head information returned by the output gamma correction table change unit 3005 coincides with the head information input by the user (YES in step S11005), a head information I/F control unit 3007 ends the processing.

If NO in step S11005, the output gamma correction table is changed in step S11006. Note that the output gamma correction table is changed similarly to the first embodiment, and a description thereof will be omitted.

As described above, according to the third embodiment, even when correction processing for correcting variations in the discharge amount of each printhead of the printer 1003 cannot be executed by two-way communication between the host computer 1001 and the printer 1003, head information of the printhead 1006 can be output to a printing medium, referred to by the user, and input by the user to the host computer 1001, and reflected on the processing parameters of the image processor 1009 in the printer driver 1002. Hence, a high-quality image can be output even with slight variations in discharge amount without varying the tint of the image.

Note that head information is output to a printing medium in the third embodiment, but the present invention is not limited to this. For example, a printer 1003 having an operation panel (not shown) incorporating a monitor can output head information to the monitor.

The above embodiments have been explained by assuming that a droplet discharged from a printhead is ink and that a liquid contained in an ink tank is ink. However, the content of the ink tank is not limited to ink. For example, the ink tank can also contain a processing solution to be discharged onto a printing medium to increase the fixing properties, water resistance, or quality of a printed image.

The above embodiments can increase the density and resolution of printing by using a system which includes a means (e.g., an electrothermal transducer or a laser beam) for generating thermal energy as energy used to discharge ink and causes a state change of the ink by this thermal energy, among other inkjet printing systems.

As a representative arrangement or principle, it is preferable to use the basic principle disclosed in, e.g., U.S. Pat. No. 4,723,129 or 4,740,796. This system is applicable to both a so-called on-demand apparatus and continuous apparatus. The system is particularly effective in an on-demand apparatus because at least one driving signal which corresponds to printing information and which gives a rapid temperature rise exceeding nuclear boiling is applied to an electrothermal transducer which corresponds to a sheet or channel holding a liquid (ink), thereby causing this electrothermal transducer to generate thermal energy and cause film boiling on the thermal action surface of a printhead, and consequently a bubble can be formed in the liquid (ink) in one-to-one correspondence with the driving signal. By growth and shrinkage of this bubble, the liquid (ink) is discharged from a discharge orifice to form at least one droplet. This driving signal is more preferably a pulse signal because growth and shrinkage of a bubble are instantaneously appropriately performed, so discharge of the liquid (ink) having high response is achieved.

This pulse driving signal is preferably a signal described in U.S. Pat. No. 4,463,359 or 4,345,262. Note that superior printing can be performed by the use of conditions described in U.S. Pat. No. 4,313,124 which is the invention concerning the rate of temperature rise on the thermal action surface.

The arrangement of a printhead can be the combination (a linear liquid channel or a right-angle liquid channel) of the discharge orifices, liquid channels, and electrothermal transducers disclosed in the specifications described above. The present invention also includes arrangements using U.S. Pat. Nos. 4,558,333 and 4,459,600 in each of which the thermal action surface is placed in a bent region. Additionally, it is possible to use an arrangement based on Japanese Patent Laid-Open No. 59-123670 in which a common slot is used as a discharge portion of a plurality of electrothermal transducers or Japanese Patent Laid-Open No. 59-138461 in which an opening for absorbing the pressure wave of thermal energy is opposed to a discharge portion.

Furthermore, a full line type printhead having a length corresponding to the width of the largest printing medium printable by a printing apparatus can have a structure which meets this length by combining a plurality of printheads as disclosed in the aforementioned specifications or can be a single integrated printhead.

In addition, it is possible to use not only a cartridge type printhead, explained in the above embodiments, in which ink tanks are integrated with a printhead itself, but also an interchangeable chip type printhead which can be electrically connected to an apparatus main body and supplied with ink from the apparatus main body when attached to the apparatus main body.

Adding a recovering means or a preliminary means for a printhead to the printing apparatus described above is preferable because printing can further stabilize. Practical examples of the additional means for a printhead are a capping means, a cleaning means, a pressurizing or drawing means, and an electrothermal transducer or another heating element or a preliminary heating means combining them. A predischarge mode for performing discharge different from printing is also effective to perform stable printing.

A printing mode of the printing apparatus is not restricted to a printing mode using only a main color such as black. That is, the apparatus can have at least a composite color mode using different colors and a full color mode using mixed colors, regardless of whether a printhead is an integrated head or the combination of a plurality of heads.

The above embodiments are explained assuming that ink is a liquid. However, it is possible to use ink which solidifies at room temperature or less but softens or liquefies at room temperature. In ink-jet systems, the general approach is to perform temperature control such that the viscosity of ink falls within a stable discharge range by adjusting the temperature of the ink itself within the range of 30° C. to 70° C. Hence, ink need only be a liquid when a printing signal used is applied to it.

Additionally, to positively prevent a temperature rise by thermal energy by positively using this temperature rise as energy of the state change from the solid state to the liquid state of ink, or to prevent evaporation of ink, ink which solidifies when left to stand and liquefies when heated can be used. That is, the present invention is applicable to any ink which liquefies only when thermal energy is applied, such as ink which liquefies when applied with thermal energy corresponding to a printing signal and is discharged as liquid ink, or ink which already starts to solidify when arriving at a printing medium. As described in Japanese Patent Laid-Open No. 54-56847 or 60-71260, this type of ink can be held as a liquid or solid in a recess or through hole in a porous sheet and opposed to an electrothermal transducer in this state. In the present invention, executing the aforementioned film boiling scheme is most effective for each ink described above.

Furthermore, the printing apparatus according to the present invention can take the form of any of an integrated or separate image output terminal of an information processing apparatus such as a computer, a copying apparatus combined with a reader or the like, and a facsimile apparatus having a transmission/reception function.

The present invention can be applied to a system constituted by a plurality of devices (e.g., a host computer, interface, reader, and printer) or to an apparatus (e.g., a copying machine or facsimile apparatus) comprising a single device.

Further, the object of the present invention can also be achieved by providing a storage medium storing program codes of software for performing the aforesaid functions according to the embodiments to a system or an apparatus, reading the program codes with a computer (or a CPU or MPU) of the system or apparatus from the storage medium, and then executing the program codes.

In this case, the program codes read out from the storage medium realize the functions according to the embodiments, and the storage medium storing the program codes constitutes the invention.

Further, as the storage medium for providing the program codes, it is possible to use, e.g., a floppy disk, hard disk, optical disk, magnetooptical disk, CD-ROM, CD-R, magnetic tape, nonvolatile memory card, and ROM.

Furthermore, besides aforesaid functions according to the above embodiments are realized by executing the program codes which are read out by a computer, the present invention includes a case where an OS (Operating System) or the like running on the computer performs a part or the whole of actual processing in accordance with designations by the program codes and realizes functions according to the above embodiments.

Furthermore, the present invention also includes a case where, after the program codes read out from the storage medium are written in a memory of a function extension board inserted into a computer or of a function extension unit connected to a computer, a CPU or the like of the function extension board or function extension unit performs a part or the whole of actual processing in accordance with designations by the program codes and realizes functions of the above embodiments.

When the present invention is applied to the above storage medium, this storage medium stores program codes corresponding to the flow chart shown in FIG. 16, 19, or 21 explained earlier.

As many apparently widely different embodiments of the present invention can be made without departing from the spirit and scope thereof, it is to be understood that the invention is not limited to the specific embodiments thereof except as defined in the appended claims.

What is claimed is:

1. A printing system having an external apparatus for generating printing data corresponding to an image to be printed and a printing apparatus for performing printing by discharging ink from a printhead to be attached, and said printing systems performs printing with said printing apparatus on the basis of the printing data to be output from the external apparatus, wherein the printing apparatus comprises:

output means for outputting discharge amount information of ink discharge amount of the printhead and identification information unique to the printhead, which are stored in storage means mounted on the printhead, to said external apparatus according to a request from said external apparatus, and the external apparatus comprises:
image processing means for processing the printing data;
input means for inputting the discharge amount information and the identification information output by said output means of said printing apparatus;
setting means for setting a processing parameter for processing by said image processing means on the basis of the discharge amount information input by said input means; and
management means for managing the processing parameter set by said setting means on the basis of the discharge amount information for the printhead, and the identification information for the printhead in correspondence with each other, and wherein a) when the identification information input by said input means is managed by said management means, said setting means performs a process by said image processing means using the processing parameter corresponding to the identification information, and b) when the identification information input by said input means is not managed by said management means, said setting means sets the processing parameter on the basis of the discharge amount information output by said output means of said printing apparatus and performs a process by said image processing means using the set processing parameter.

2. The system according to claim 1, wherein said external apparatus transmits a signal requesting the identification information to said printing apparatus according to a printing start instruction, and when the identification information is not manages by said management means said setting means transmits a signal requesting the discharge amount information to said printing apparatus.

3. The system according to claim 1, wherein said output means outputs the discharge amount information and the identification information when the printhead is exchanged.

4. An information processing apparatus for inputting printing data to a printing apparatus for performing printing by discharging ink from a printhead, comprising:
image processing means for processing the printing data;
input means for requesting the printing apparatus and inputting discharge amount information of ink discharge amount of the printhead and identification information unique to the printhead, which are stored in storage means mounted on the printhead, from said printing apparatus, and
setting means for setting a processing parameter for processing by said image processing means on the basis of the discharge amount information input by said input means; and
management means for managing the processing parameter set by said setting means on the basis of the discharge amount information for the printhead, and the identification information for the printhead in correspondence with each other, and wherein a) when the identification information input by said input means is managed by said management means, said setting means performs a process by said image processing means using the processing parameter corresponding to the identification information, and b) when the identification information input by said input means is not managed by said management means, said setting means sets the processing parameter on the basis of the discharge amount information input by said input means and performs a process by said image processing means using the set processing parameter.

5. The apparatus according to claim 4, wherein said external apparatus transmits a signal requesting the identification information to said printing apparatus according to a printing start instruction, and when the identification information is not managed by said management means, said setting means transmits a signal requesting the discharge amount information to said printing apparatus.

6. A control method for printing system having an external apparatus for generating printing data corresponding to an image to be printed and a printing apparatus for performing printing by discharging ink from a printhead to be attached to the printing apparatus, comprising:

an output step of outputting discharge amount information of ink discharge amount of the printhead and identification information unique to the printhead, which are stored in storage means mounted on the printhead, to said external apparatus according to a request from said external apparatus;

an input step of inputting the discharge amount information and the identification information output in said output step to said external apparatus; and a setting step of setting a processing parameter for processing by image processing means of the external apparatus on the basis of the discharge amount information input in said input step, wherein the external apparatus manages the processing parameter set in said setting step on the basis of the discharge amount information for the printhead, and the identification information for the printhead in correspondence with each other, and wherein a) when the identification information input in said input step is managed by the external apparatus, said setting step includes performing a process by the image processing means using the processing parameter corresponding to the identification information, and b) when the identification information input in said input step is not managed by the external apparatus, said setting step includes setting the processing parameter on the basis of the discharge amount information output in said output step of the printing apparatus and performing a process by the image processing means using the set processing parameter.

7. The method according to claim 6, wherein the external apparatus transmits a signal requesting the identification information to the printing apparatus according to a printing start instruction, and when the identification information is not managed by the external apparatus, said setting step includes transmitting a signal requesting the discharge amount information to the printing apparatus.

8. The method according to claim 6, wherein said output step includes outputting the discharge amount information and the identification information when the printhead is exchanged.

9. A control method for an information processing apparatus for inputting printing data to a printing apparatus for performing printing by discharging ink from a printhead, comprising:

an image processing step of processing the printing data;

an input step of requesting the printing apparatus and inputting discharge amount information of ink discharge amount of the printhead and identification information unique to the printhead, which are stored in storage means mounted on the printhead, from the printing apparatus;

a setting step of setting a processing parameter for processing in said image processing step on the basis of the discharge amount information input in said input step; and a management step of managing the processing parameter set in said setting step on the basis of the discharge amount information for the printhead, and the identification information for the printhead in correspondence with each other, wherein a) when the identification information input in said input step is managed in said management step, said setting step includes performing a process in said image processing step using the processing parameter corresponding to the identification information, and b) when the identification information input in said input step is not managed in said management step, said setting step includes setting the processing parameter on the basis of the discharge amount information input in said input step and performing a process in said image processing step using the set processing parameter.

10. The method according to claim 9, wherein a signal requesting the identification information is transmitted to the printing apparatus according to a printing start instruction, and when the identification information is not managed in said management step, said setting step includes transmitting a signal requesting the discharge amount information to the printing apparatus.

11. The method according to claim 9, wherein the discharge amount information and the identification information is outputted from the printing apparatus when the printhead is exchanged.

* * * * *

UNITED STATES PATENT AND TRADEMARK OFFICE
CERTIFICATE OF CORRECTION

PATENT NO. : 6,885,472 B1
DATED : April 26, 2005
INVENTOR(S) : Yuji Konno et al.

It is certified that error appears in the above-identified patent and that said Letters Patent is hereby corrected as shown below:

Column 1,
Line 38, "vary" should read -- may vary --.

Column 24,
Line 61, "systems" should read -- system --.

Column 25,
Line 35, "manages" should read -- managed --.

Signed and Sealed this

Twenty-eighth Day of March, 2006

JON W. DUDAS
*Director of the United States Patent and Trademark Office*